(12) United States Patent
Doo et al.

(10) Patent No.: US 10,005,119 B2
(45) Date of Patent: *Jun. 26, 2018

(54) FASTENING METHOD AND APPARATUS

(71) Applicant: Henrob Limited, Fintshire (GB)

(72) Inventors: Roger Stanton Doo, Flintshire (GB); Stuart Edmond Blacket, Queensland (AU); Wojciech Gostylla, Queensland (AU); Neal Sean Williams, Queensland (AU)

(73) Assignee: Henrob Limited, Flintshire (GB)

( * ) Notice: Subject to any disclaimer, the term of this patent is extended or adjusted under 35 U.S.C. 154(b) by 63 days.

This patent is subject to a terminal disclaimer.

(21) Appl. No.: 15/155,461

(22) Filed: May 16, 2016

(65) Prior Publication Data

US 2016/0279694 A1    Sep. 29, 2016

Related U.S. Application Data

(63) Continuation of application No. 13/882,836, filed as application No. PCT/GB2011/001586 on Nov. 10, 2011, now Pat. No. 9,339,899.

(30) Foreign Application Priority Data

Nov. 10, 2010  (GB) .................................. 1018995.9
Nov. 16, 2010  (GB) .................................. 1019410.8

(51) Int. Cl.
*B21J 15/02*  (2006.01)
*B21J 15/10*  (2006.01)
(Continued)

(52) U.S. Cl.
CPC ............. *B21J 15/02* (2013.01); *B21J 15/025* (2013.01); *B21J 15/10* (2013.01); *B21J 15/28* (2013.01);
(Continued)

(58) Field of Classification Search
CPC ......... Y10T 29/49835; Y10T 29/49954; Y10T 29/49943; Y10T 29/5343; Y10T 29/5377;
(Continued)

(56) References Cited

U.S. PATENT DOCUMENTS 2,244,048 A   6/1941 Butter
3,072,279 A   1/1963 Ikelheimer
(Continued)

FOREIGN PATENT DOCUMENTS

CN    1113837    12/1995
DE    2225966    12/1973
(Continued)

OTHER PUBLICATIONS

U.S. Appl. No. 13/880,246, Application and Drawings, filed Apr. 18, 2013, 57 pages.
(Continued)

*Primary Examiner* — Jermie Cozart
(74) *Attorney, Agent, or Firm* — Michael Best & Friedrich LLP

(57) ABSTRACT

A fastening method comprising using a control apparatus to select a first upsetting volume of an upsetting die, using a punch to push a first fastener into a workpiece and using the upsetting die to upset the first fastener, then using the control apparatus to select a second upsetting volume of the upsetting die, using the punch to push a second fastener into a workpiece and using the upsetting die to upset the second fastener, or using the punch and the upsetting die to form a clinch joint.

34 Claims, 13 Drawing Sheets

(51) Int. Cl.
  *B21J 15/28* (2006.01)
  *B21J 15/36* (2006.01)
  *B23P 19/02* (2006.01)

(52) U.S. Cl.
  CPC .............. *B21J 15/36* (2013.01); *B23P 19/02* (2013.01); *Y10T 29/49943* (2015.01); *Y10T 29/49947* (2015.01); *Y10T 29/49956* (2015.01); *Y10T 29/5148* (2015.01); *Y10T 29/53* (2015.01); *Y10T 29/5343* (2015.01); *Y10T 29/5377* (2015.01); *Y10T 29/53539* (2015.01); *Y10T 29/53774* (2015.01)

(58) Field of Classification Search
  CPC ........ B21J 15/025; B21J 15/285; B21J 15/28; B21J 15/02; B21J 15/10; B21J 15/32; B21D 39/034; B23P 19/062
  See application file for complete search history.

(56) References Cited

U.S. PATENT DOCUMENTS

| | | | |
|---|---|---|---|
| 3,250,451 | A | 5/1966 | Fulop |
| 3,432,925 | A | 3/1969 | Woolley |
| 3,630,116 | A | 12/1971 | Harper |
| 3,948,427 | A | 4/1976 | Claydon |
| 4,099,324 | A | 7/1978 | Johnson et al. |
| 4,201,325 | A | 5/1980 | Jochum |
| 4,459,735 | A | 7/1984 | Sawdon |
| 4,615,475 | A | 10/1986 | Fuhrmeister |
| 4,757,609 | A | 7/1988 | Sawdon |
| 4,760,633 | A | 8/1988 | Dacey |
| 4,819,856 | A | 4/1989 | Davern et al. |
| 4,884,431 | A | 12/1989 | Dacey |
| 5,051,020 | A | 9/1991 | Schleicher |
| 5,133,206 | A | 7/1992 | Jackson |
| 5,181,315 | A | 1/1993 | Goodsmith |
| 5,502,884 | A | 4/1996 | Ladouceur |
| 5,528,815 | A | 6/1996 | Webb |
| 5,678,970 | A | 10/1997 | Caulk |
| 5,752,305 | A | 5/1998 | Cotterill et al. |
| 5,779,127 | A | 7/1998 | Blacket et al. |
| 5,884,386 | A | 3/1999 | Blacket et al. |
| 6,106,446 | A | 8/2000 | Kelly et al. |
| 6,135,933 | A | 10/2000 | Kelly et al. |
| 6,205,640 | B1 | 3/2001 | Dubugnon |
| 6,405,420 | B1 | 6/2002 | Donhauser et al. |
| 6,722,013 | B1 | 4/2004 | Rapp |
| 6,763,568 | B1 | 7/2004 | Mauermann et al. |
| 7,287,411 | B2 | 10/2007 | Kuhne |
| 7,425,111 | B2 | 9/2008 | Ladouceur |
| 7,681,296 | B2 | 3/2010 | Rapp |
| 9,339,899 | B2 * | 5/2016 | Doo .................... B21J 15/025 |
| 2004/0060958 | A1 | 4/2004 | Kondo |
| 2006/0010671 | A1 | 1/2006 | Mair et al. |
| 2006/0163309 | A1 | 7/2006 | Merk |
| 2008/0016935 | A1 | 1/2008 | Rotter et al. |
| 2008/0066286 | A1 | 3/2008 | Saathoff |
| 2009/0107204 | A1 | 4/2009 | Widdel et al. |
| 2010/0135744 | A1 | 6/2010 | Babej et al. |

FOREIGN PATENT DOCUMENTS

| | | |
|---|---|---|
| DE | 4419065 | 12/1995 |
| DE | 19524164 | 9/1996 |
| DE | 19905527 A1 | 8/2000 |
| DE | 19927101 | 12/2000 |
| DE | 19940038 | 7/2001 |
| DE | 10056859 | 5/2002 |
| EP | 0387430 | 9/1990 |
| EP | 0541148 | 5/1993 |
| EP | 0567240 | 10/1993 |
| EP | 0815980 | 1/1998 |
| EP | 0893180 | 1/1999 |
| EP | 0922538 | 6/1999 |
| EP | 0983810 | 8/2000 |
| EP | 1477249 | 11/2004 |
| EP | 1690613 | 8/2006 |
| GB | 2184677 | 7/1987 |
| IT | 1243844 | 6/1994 |
| JP | 59077161 | 5/1984 |
| JP | 2001304214 | 10/2001 |
| JP | 2003290866 | 10/2003 |
| JP | 2003305531 | 10/2003 |
| JP | 2004001045 | 1/2004 |
| JP | 2004358496 | 12/2004 |
| WO | 8907020 | 8/1989 |
| WO | 9309918 | 5/1993 |
| WO | 9310925 | 5/1993 |
| WO | 9415736 | 6/1993 |
| WO | 9509307 | 4/1995 |
| WO | 9535174 | 12/1995 |
| WO | 1999021668 | 5/1999 |
| WO | 2000018528 | 4/2000 |
| WO | 2000076688 | 12/2000 |
| WO | 2002011944 | 2/2002 |
| WO | 2003061869 | 7/2003 |
| WO | 2006015785 | 2/2006 |
| WO | 2007112720 | 10/2007 |
| WO | 2007137367 | 12/2007 |

OTHER PUBLICATIONS

PCT/GB2011/001584 International Search Report and Written Opinion dated Jul. 5, 2012 (10 pages).
Office Action from the US Patent and Trademark Office for U.S. Appl. No. 13/880,246 dated Mar. 24, 2015 (11 pages).
PCT/GB2011/001586 International Preliminary Report on Patentability dated Jan. 21, 2013 (17 Pages).
PCT/GB2011/001586 Written Opinion dated Dec. 14, 2012 (7 Pages).
EP14176140.3 Extended European Search Report dated Sep. 22, 2015 (6 pages).
Office Action from the Japanese Patent Office for Application No. 2014-106216 dated Sep. 15, 2015 (11 pages).
EP11791608.0 Communication pursuant to Article 94(3) from the European Patent Convention dated Sep. 17, 2015 (5 pages).
First Office Action from the State Intellectual Property Office of China for Application No. 2016100093772 dated Jun. 1, 2017 (17 pages, which includes translation of the detailed comments on the independent claims).
Korean Decision to Granted for Application No. 10-2013-7014830 dated Jan. 23, 2018 (3 pages including English Translation).

* cited by examiner

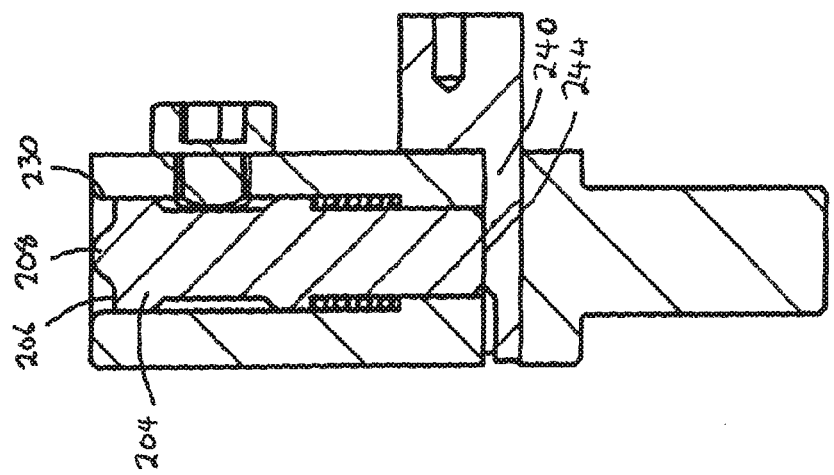
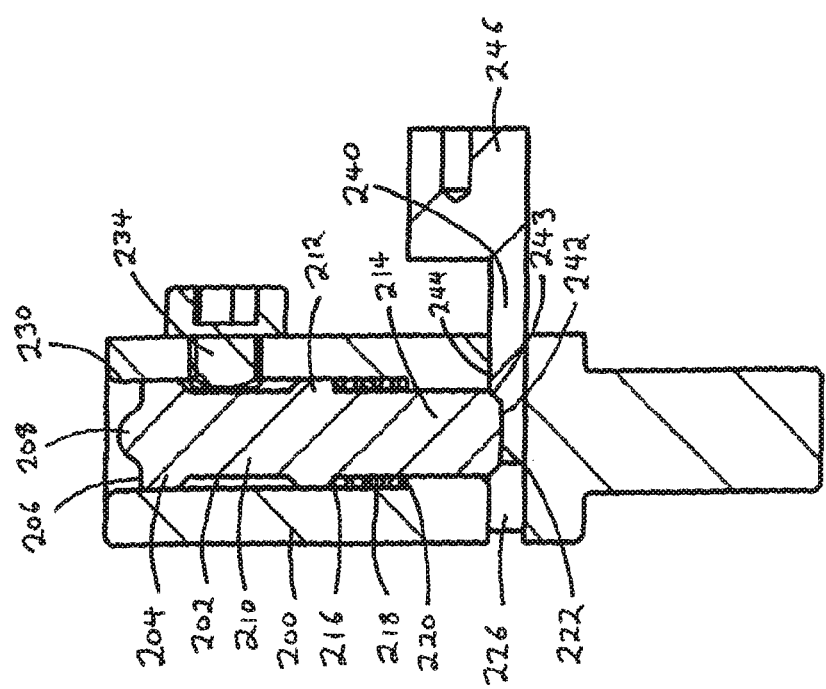

FASTENING METHOD AND APPARATUS

RELATED APPLICATION DATA

This patent application is a continuation of U.S. patent application Ser. No. 13/882,836 filed May 1, 2013, which is a national stage filing under 35 U.S.C. 371 of International Application No. PCT/GB2011/001586 filed Nov. 10, 2011, which claims priority to United Kingdom Patent Application Nos. 1019410.8 filed Nov. 16, 2010 and 1018995.9 filed Nov. 10, 2010, the entire contents of all of which are herein incorporated by reference.

BACKGROUND OF THE INVENTION

The present invention relates to a fastening method and apparatus.

The term "fastener" is used herein to include rivets, screws, slugs, weld studs, mechanical studs and other types of fastening devices.

SUMMARY OF THE INVENTION

Known fastening apparatus include a nose assembly into which a rivet is passed from a rivet storage location, and from which the rivet is inserted into a workpiece by a punch. The fastening apparatus includes an upsetting die which is located beneath the workpiece and which is configured to upset the rivet when the rivet is inserted into the workpiece. The volume and shape of the upsetting die is chosen to provide a desired degree of upsetting such that the rivet adopts a desired shape when it is inserted into the workpiece. The feeding of at least two different rivets (i.e. rivets having different dimensions) to the nose assembly is already known. When it is desired to fasten a different workpiece or a different location on a workpiece (e.g. a different combination of material types and/or thicknesses) or insert a different rivet (i.e. a rivet with different dimensions or hardness) into the workpiece, it is frequently necessary to remove the upsetting die and replace it with a different upsetting die which has a shape and volume that is more suited to the different rivet and/or different combination of material types and/or thicknesses.

It is desirable to provide a fastening method which overcomes or mitigates a problem associated with known fastening methods.

According to first aspect of the invention there is provided a fastening method comprising using a control apparatus to select a first upsetting volume of an upsetting die, using a punch to push a first fastener into a workpiece and using the upsetting die to upset the first fastener, then using the control apparatus to select a second upsetting volume of the upsetting die, using the punch to push a second fastener into a workpiece and using the upsetting die to upset the second fastener, or using the punch and the upsetting die to form a clinch joint.

The method allows two or more different rivets (i.e. rivets having different dimensions and/or hardnesses) to be inserted into a workpiece (or different workpieces) without having to use two or more separate fastening apparatus. This is advantageous because it provides flexibility which allows a production line to be designed with a lower quantity of fastening apparatus than would otherwise be required. Since a lower quantity of fastening apparatus may be used, a correspondingly lower quantity of peripheral apparatus associated with implementation of the fastening apparatus may be used (for example robots and materials handling equipment). The method thus allows a cheaper production line to be designed.

The method also allows two or more different rivets (i.e. rivets having different dimensions and/or hardnesses) to be inserted into a workpiece (or different workpieces) using the same fastening apparatus without removing the upsetting die and replacing it with an alternative upsetting die. This provides a significant efficiency improvement, since operation of a fastening apparatus does not need to be interrupted in order to allow the upsetting die to be changed. Instead, operation of the fastening apparatus may continue almost immediately, a small time between the insertion of fasteners being required in order to allow the volume of the upsetting die to be changed. This small time may for example be less than the time required for the fastening apparatus or workpiece to be moved from a first fastener insertion location to a second fastener insertion location, in which case changing the volume of the upsetting die does not reduce the rate of operation of the fastening apparatus.

The method also allows rivets having the same dimensions to be inserted into workpieces having different material combinations (e.g. material types and/or thicknesses) without having to remove the upsetting die and replace it with an alternative upsetting die. Instead, the volume of the upsetting die is changed in order to accommodate the different material combinations of the workpiece.

The method allows switching between fastener insertion (e.g. insertion of self-piercing rivets) and clinching, thereby avoiding the need to provide a fastening apparatus for fastener insertion and a separate fastening apparatus for clinching.

The selection of the upsetting volume of the upsetting die by the control apparatus may be automated.

The selection of the upsetting volume of the upsetting die may be based on previously stored information and/or feedback.

The method may further comprise again selecting the first upsetting volume of the upsetting die, and using the punch to push a subsequent fastener into a workpiece and using the upsetting die to upset the subsequent fastener.

The upsetting volume of the upsetting die may be fixed during upsetting of the fasteners.

Selecting the upsetting volume of the upsetting die may comprise selecting the depth of the upsetting die.

The upsetting die may be at least partially formed by a surface of a rod located in a bore, the rod being moved within the bore to change the upsetting volume of the upsetting die.

The position of the rod within the bore may be determined by an adjustable end stop.

The adjustable end stop may comprise a cam which is moveable between a plurality of configurations which determine the position of the rod within the bore.

The cam may be a plate which is configured to rotate about an axis of rotation.

The upsetting die may be at least partially formed by a surface of a rod located in a bore in a housing, the housing being moved relative to the rod to change the upsetting depth of the upsetting die.

The upsetting die may be at least partially formed by a surface of a rod located in a bore in a housing and at least partially formed by a sleeve located between the rod and the housing, the sleeve being moved relative to the rod and the housing to change the upsetting diameter of the upsetting die.

The first fastener and the second fastener may have different dimensions and/or hardnesses.

The first fastener and the second fastener have may have the same dimensions, and the workpiece into which the second fastener is pushed may comprise a combination of materials which is different to the combination of materials which comprises the workpiece into which the first fastener is pushed.

The selection of the second upsetting volume of the upsetting die may be performed whilst the punch and upsetting die are moving between a first fastening location and a second fastening location, or whilst the workpiece is being moved between a first fastening location and a second fastening location.

The upsetting volume of the upsetting die may be selected using an actuator.

The feedback may include one or more of movement of the punch, force experienced by the punch and force experienced by the upsetting die.

The control apparatus may determine and selects an upsetting volume of the upsetting die which will provide improved fastening based upon the feedback.

The method may further comprise selecting a volume which is different from the first upsetting volume or the second upsetting volume and thereby separating or assisting in separation of workpiece material and the upsetting die.

According to a second aspect of the invention these is provided a fastening method comprising using a punch to push a fastener into a workpiece and using an upsetting die to upset the first fastener, or using the punch and the upsetting die to form a clinch joint, the method further comprising changing the volume of the upsetting die once fastening has been completed and thereby separating or assisting in separation of workpiece material and the upsetting die.

Changing the volume of the upsetting die may comprise reducing the volume of the upsetting die.

According to a third aspect of the invention these is provided a method of manufacturing a product or a sub-assembly comprising fastening one or more workpieces in accordance with the first or second aspects of the invention.

According to a fourth aspect of the invention there is provided a fastening apparatus comprising a punch and an upsetting die, wherein the upsetting volume of the upsetting die is adjustable and wherein the fastening apparatus further comprises an actuator and control apparatus which are configured to adjust the upsetting volume of the upsetting die, the control apparatus being capable of selecting an upsetting volume of the upsetting die individually for each fastener which is inserted into a workpiece.

The control apparatus may be configured to select the upsetting volume of the upsetting die in an automated manner.

The control apparatus may be configured to select the upsetting volume of the upsetting die based on previously stored information and/or feedback.

The actuator and control apparatus may be configured to fix the upsetting volume of the upsetting die during upsetting of the fasteners.

The control apparatus may be capable of selecting an upsetting volume which is suitable for forming a clinch joint.

The upsetting die may be at least partially formed by a surface of a rod located in a bore, the rod being movable within the bore to change the upsetting volume of the upsetting die.

The apparatus may further comprise an adjustable end stop which is configured to determine the position of the rod within the bore during upsetting of a fastener.

The adjustable end stop may comprise a cam which is moveable between a plurality of configurations which determine the position of the rod within the bore.

The cam may be a plate which is configured to rotate about an axis of rotation.

The upsetting die may be at least partially formed by a surface of a rod located in a bore in a housing, the housing being moveable relative to the rod to change the upsetting depth of the upsetting die.

The upsetting die may be at least partially formed by a surface of a rod located in a bore in a housing and is at least partially formed by a sleeve located between the rod and the housing, the sleeve being moveable relative to the rod and the housing to change the upsetting diameter of the upsetting die.

The apparatus may further comprise one or more sensors which are configured to provide feedback to the control apparatus which is measured during fastening, The control apparatus may be configured to determine and select an upsetting volume of the upsetting die which will provide improved fastening based upon the feedback.

The one or more sensors may be configured to measure one or more of the movement of the punch, force experienced by the punch and force experienced by the upsetting die.

The control apparatus may be configured to change the upsetting volume of the upsetting die whilst the fastening apparatus is moving between a first fastening location and a second fastening location, or whilst the workpiece is moving between a first fastening location and a second fastening location.

The control apparatus may be configured to select a volume which is different from the upsetting volume after a fastener has been upset, thereby separating or assisting in separating workpiece material and the upsetting die.

According to a fifth aspect of the invention there is provided a fastening system comprising the fastening apparatus of the fourth aspect of the invention, and further comprising a rivet feeding system and a control system.

According to a sixth aspect of the invention there is provided a fastening apparatus comprising a punch and an upsetting die, wherein the volume of the upsetting die is adjustable and wherein the fastening apparatus further comprises an actuator and control apparatus which are configured to adjust the volume of the upsetting die, the control apparatus being configured to select an upsetting volume of the upsetting die to upset a fastener inserted into a workpiece or to form a clinch joint, the control apparatus being further configured to change the volume of the upsetting die once fastening has been completed and thereby separate or assist in separating workpiece material and the upsetting die.

The change of the volume of the upsetting die may be a reduction of the volume of the upsetting die.

According to a seventh aspect of the invention there is provided a fastening apparatus comprising a punch and an upsetting die, wherein the upsetting volume of the upsetting die is adjustable and wherein the fastening apparatus further comprises an actuator and control apparatus which are configured to adjust the upsetting volume of the upsetting die, the control apparatus being configured to select a first upsetting volume of the upsetting die to upset one or more fasteners inserted into a workpiece, and to then select a second upsetting volume of the upsetting die to upset one or more fasteners inserted into a workpiece or to form a clinch joint.

According to an eighth aspect of the invention there is provided a fastening method comprising selecting a first upsetting volume of an upsetting die, using a punch and the upsetting die to form a first clinch joint in a workpiece, then selecting a second upsetting volume of the upsetting die and using the punch and the upsetting die to form a second clinch joint in the workpiece.

The second upsetting volume of the upsetting die may be determined and selected based upon feedback received during formation of the first clinch joint. This may be done for example in order to provide an improved clinch joint.

According to a ninth aspect of the invention there is provided a fastening apparatus comprising a punch and an upsetting die, wherein the upsetting volume of the upsetting die is adjustable and wherein the fastening apparatus further comprises an actuator and control apparatus which are configured to adjust the upsetting volume of the upsetting die, the control apparatus being configured to select a first upsetting volume of the upsetting die to form a first clinch joint in a workpiece, and to then select a second upsetting volume of the upsetting die to form a second clinch joint.

The control apparatus may be configured to determine and select the second upsetting volume of the upsetting die based upon feedback received during formation of the first clinch joint. This may be done for example in order to provide an improved clinch joint.

BRIEF DESCRIPTION OF THE DRAWINGS

Specific embodiments of the present invention will now be described with reference to the accompanying drawings by way of example only, in which:

FIG. 5 is a cross-sectional view of an upsetting die assembly according to an alternative embodiment of the invention in a first configuration;

FIG. 6 is a cross-sectional view of the upsetting die assembly of FIG. 5 in a second configuration;

DETAILED DESCRIPTION

Figure 1:
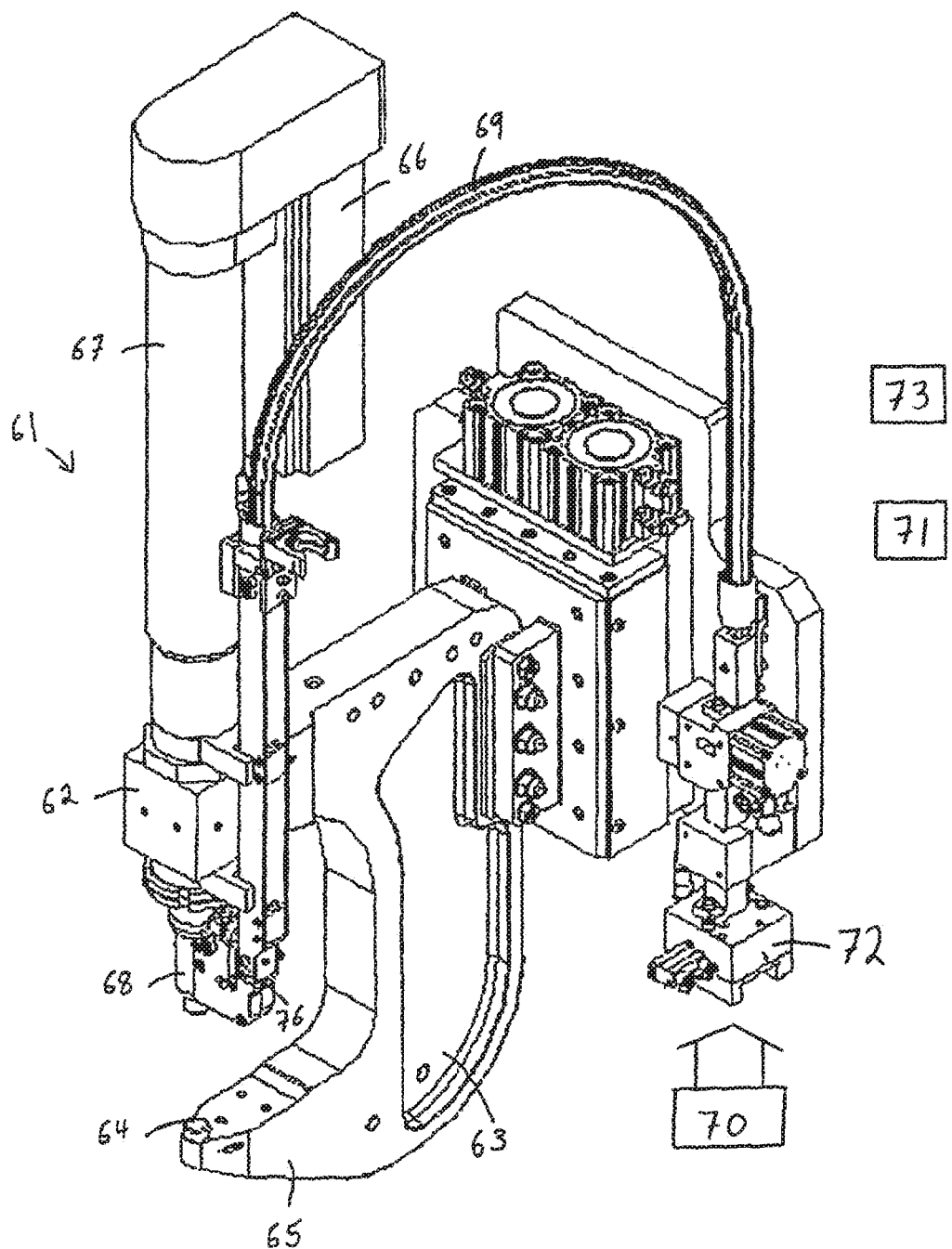
FIG. 1 is a perspective view of a fastening apparatus according to an embodiment of the present invention.

Referring to FIG. 1 of the drawings, a fastening apparatus according to an embodiment of the invention comprises a rivet setting tool 61 that is supported by an upper jaw 62 of a C-frame 63 above an upsetting die assembly 64 disposed on a lower jaw 65 of the frame. Rivets are inserted by the tool into a workpiece (not shown) supported over the upsetting die assembly 64 as is well known in the art.

The setting tool 61 comprises an electric drive 66 (other types of drive such as hydraulic or pneumatic can be used) that operates to drive a reciprocal punch (hidden in FIG. 1) in a cylindrical housing 67 and a nose assembly 68. The reciprocal punch is used to insert rivets from the nose assembly 68 into a workpiece. Rivets are supplied under air or gas pressure from a bulk feeder (not shown) via a delivery tube 69. Supplied rivets pass through the delivery tube 69 to a feeder assembly 76 that is mounted immediately adjacent to the nose assembly 68. The rivets are then transferred from the feeder assembly 76 into the nose assembly 68 from where they are inserted into the workpiece. When rivets are inserted into the workpiece they are upset by the upsetting die assembly 64.

A fastening system may comprise the fastening apparatus described above, and may further comprise a rivet feeding system 70 and a control system 71. The rivet feeding system is configured to deliver rivets via a connector 72 of the fastener apparatus to the delivery tube 69. The control system 71 is configured to control delivery of rivets to the nose assembly 68, and is configured to control operation of the reciprocal punch.

Figure 2A:
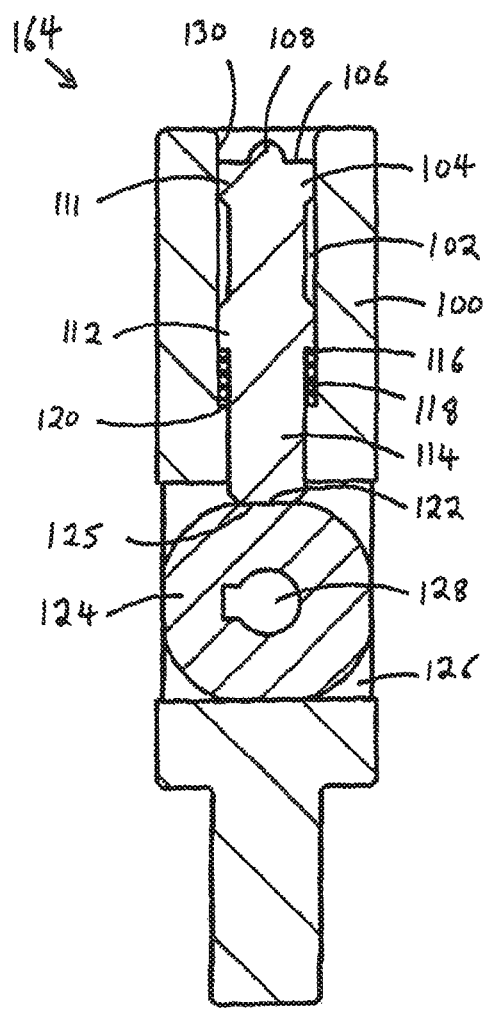
FIGS. 2A and 2B are two cross-sectional views of an upsetting die assembly according to an embodiment of the present invention in a first configuration.
Figure 2B:
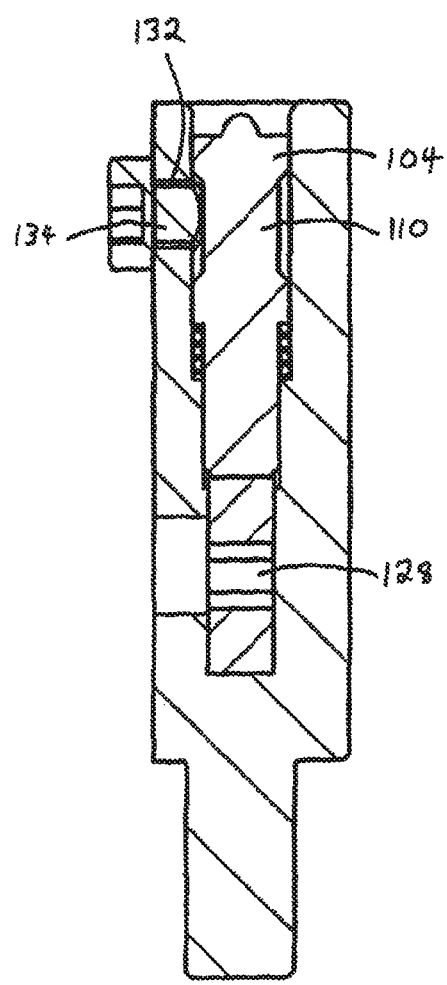

FIGS. 2A and 2B show an upsetting die assembly 164 according to an embodiment of the invention. FIG. 2A shows the upsetting die assembly in cross-section viewed from one side, and FIG. 2B shows the upsetting die assembly in cross-section but rotated through 90 degrees. The upsetting die assembly 64 comprises a housing 100 within which a generally cylindrical bore 102 is provided. A rod 104 is located within the bore 102. The rod 104 is provided at an upper end with a substantially flat upper surface 106 from which a pip 108 projects. An upper end of the rod 104 has a diameter which substantially corresponds with the diameter of the bore 102 such that the upper end of the rod 104 does not move laterally within the bore (although a small degree of lateral movement may arise from tolerances in the size of the rod and the bore during their manufacture). A lower end 122 of the rod 104 is bevelled to assist insertion of the rod into the bore 102. The rod 104 includes a portion having a reduced diameter 110 which connects an upper portion 111 of the rod with a central portion 112, the central portion having a diameter which is substantially equal to the diameter of the upper portion. A lower portion 114 of the rod has a reduced diameter and connects to the central portion 112 at a step 116 at which the diameter of the rod increases. A helical spring 118 abuts against the step 116. An opposite end of the helical spring 118 abuts against a step 120 at which the diameter of the bore 102 reduces. The helical spring 118 resiliently biases the rod 104 upwards. The reduced diameter of the bore 102 substantially corresponds with the diameter of the lower portion 114 of the rod 104.

A lowermost end 122 of the rod 104 abuts against a rotatably mounted adjustable end stop 124 when a fastener is being inserted into a workpiece. However, when a fastener is not being inserted into a workpiece (i.e. when no workpiece is present in the upsetting die), the helical spring 118 pushes the rod 104 upwards so that it is no longer in contact with the adjustable end stop 124. The adjustable end stop 124 is provided with four substantially flat surfaces, each of which is arranged to provide a contact surface which receives the lowermost end 122 of the rod 104. The adjustable end stop 124 is located in an opening 126 in the housing 100 and is provided with an opening 128 which receives an actuator rod (not shown) that is used to rotate the adjustable end stop. The adjustable end stop opening 128 is generally circular but includes a slot which may help to ensure that the actuator grips the adjustable end stop 124 and is able to rotate it (rather than rotating within the adjustable end stop opening).

A threaded bore 132 is provided on one side of the housing 100, and a threaded plug 134 is held in the threaded bore. The threaded plug 134 extends into the bore 102 at a location which corresponds with the location of the reduced diameter section 110 of the rod 104. The threaded plug 134 thus restricts movement of the rod 104, for example preventing the rod from falling out of the bore 102.

In use, the adjustable end stop 124 has a first configuration as shown in FIG. 2A. The helical spring 118 is in compression and pushes the rod 104 upwards such that its lowermost end 122 is raised above a surface 125 of the adjustable end stop 124. However, when a fastener is being inserted into a workpiece the rod 104 is pushed downwards against the bias of the helical spring 118 so that the bottom surface 122 of the rod presses against the surface 125 of the adjustable end stop 124 (pressure being exerted by a punch of the fastening apparatus). The resilient biasing force provided by the helical spring 118 is less than the force needed to upset a rivet. Thus, the helical spring 118 has been compressed such that the rod is pressed against the surface 125 of the adjustable end stop 124 before upsetting of the rivet takes place. Consequently, the adjustable end stop 124 determines the position of the rod 104 during upsetting of a fastener. This is the position shown in FIGS. 2A and 2B.

When the adjustable end stop 124 is in the first configuration, as shown in FIGS. 2A and 2B, the flat upper surface 106 of the rod is located a predetermined distance below an upper end of the bore 102. The predetermined distance may for example be 1 mm or some other suitable distance. The flat upper surface 106 of the rod 104 and the pip 108 of the rod, together with a collar 130 formed by an upper end of the bore 102, form an upsetting die which upsets rivets during operation of the fastening apparatus. The diameter of the collar 130, which provides an inner side wall of the upsetting die, may be suitable for the manufacture of a desired range of riveted and/or clinched joints. The upsetting die has a volume which is fixed during upsetting of the rivet, the volume being determined by the distance between the flat upper surface 106 of the rod 104 and the top of the bore 102. This distance is determined by the height of the surface 125 of the adjustable end stop 124 upon which the rod 104 rests, which in turn is determined by the vertical diameter of the adjustable end stop.

The volume of the upsetting die defined by the flat upper surface 106, pip 108 and collar 130 may be suited for upsetting a rivet having particular dimensions. It may be desired to change the volume of the upsetting die in order to allow a rivet having different dimensions to be used by the fastening apparatus.

Figure 3:
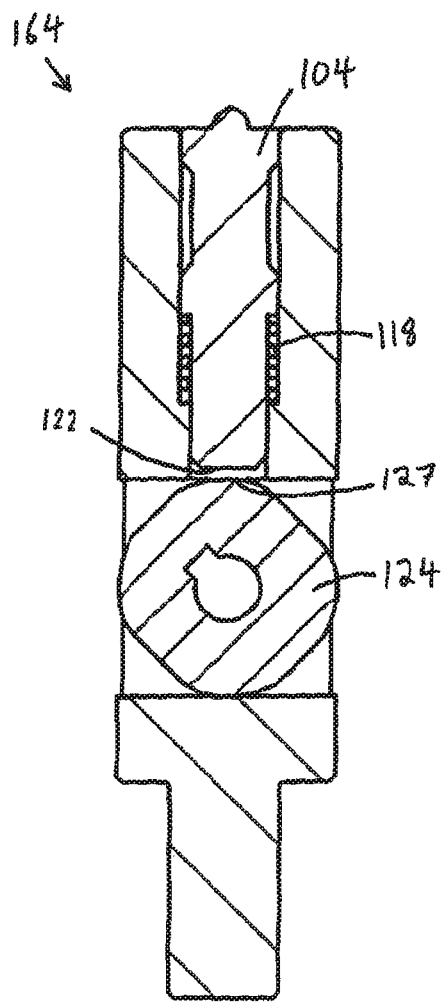
FIG. 3 is a cross-sectional view of the upsetting die assembly of FIG. 2A in a second configuration.
Figure 4:
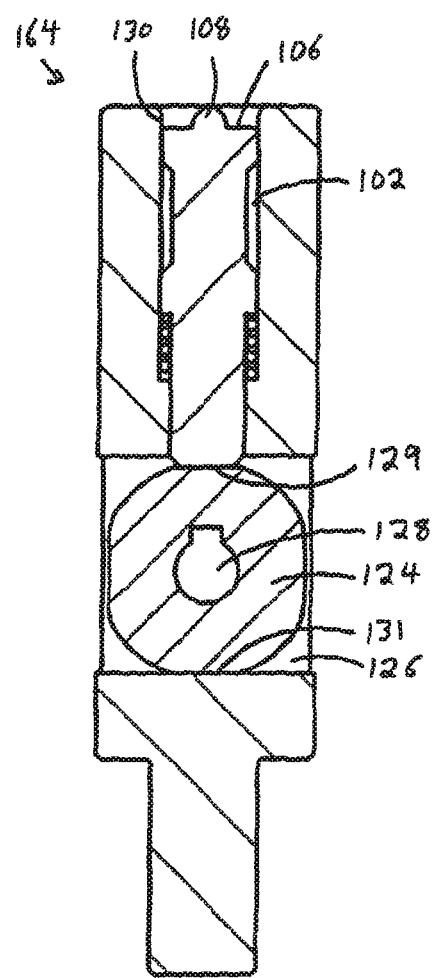
FIG. 4 is a cross-sectional view of the upsetting die assembly of FIG. 2A in a third configuration.

FIG. 3 shows the rod 104 and adjustable end stop 124 in an intermediate configuration which is between the first operational configuration shown in FIGS. 2A and 2B and a second operational configuration shown in FIG. 4. In FIG. 3 the adjustable end stop 124 has been rotated through 45°. The helical spring 118 pushes the rod 104 upwards, thereby providing a gap between the lowermost end 122 of the rod and the adjustable end stop 124. This allows the adjustable end stop 124 to be rotated freely without it having to push the rod 104 upwards. This reduces wear of the adjustable end stop 124 and wear of the lowermost end 122 of the rod 104.

In FIG. 4 the rotatably mounted adjustable end stop has been rotated through 90° and is in a second operational configuration. The adjustable end stop 124 provides a surface 129 onto which the rod 104 is pressed when a fastener is being inserted into a workpiece. The vertical diameter of the adjustable end stop 124 is greater than the vertical diameter of the adjustable end stop in the configuration shown in FIGS. 2A and 2B (the smaller diameter of the adjustable end stop is now the horizontal diameter of the adjustable end stop). As a result, during upsetting of a rivet the rod 104 lies further up the bore 102, and the distance between the flat upper surface 106 of the rod and an upper end of the bore 102 is reduced. The flat upper surface 106 and pip 108 of the rod 104 together with the collar 130 of the housing 100 thus form an upsetting die which has a smaller volume than the upsetting die of FIGS. 2A and 2B. This allows rivets having different dimensions to be inserted into a workpiece (for example rivets having a shorter shank).

As may be appreciated from comparison of FIG. 2A and FIG. 4, the adjustable end stop opening 128 moves upwards when the adjustable end stop 124 is rotated from the first configuration to the second configuration. The upward movement of the adjustable end stop opening 128 is half of the upward movement of the rod 104, and may for example be 0.5 mm. The actuator (not shown) which is used to rotate the adjustable end stop 124 is configured to be able to accommodate this movement of the adjustable end stop opening 128.

A substantially flat surface 131 of the adjustable end stop 124 which is opposite to the rod 104 is in contact with a bottom surface of the opening 126 of the housing 100. The adjustable end stop 124 is formed from a material which is sufficiently strong to resist significant deformation when pressure is applied to the rod 104 during upsetting of a rivet. Pressure which is applied via the rod 104 to the adjustable end stop 124 passes from the adjustable end stop to the lowermost surface of the opening 126 and from there is transferred to a lower jaw 65 of the C-frame 63 (See FIG. 1).

The embodiment of the invention allows the volume of the upsetting die to be changed rapidly by rotation of the adjustable end stop 124 through 90°. This allows the fastening apparatus to switch rapidly from insertion of a first fastener type to insertion of a second fastener type (e.g. rivets having different dimensions). It also allows the fastening apparatus to switch rapidly from insertion of a fastener into a workpiece comprising a first material combination to insertion of a fastener (e.g. having the same dimensions) into a workpiece comprising a second material combination. The term "material combination" may refer to the thicknesses of materials which comprise the workpiece and/or may refer to the types of material which comprise the workpiece. Rotation of the adjustable end stop 124 by the actuator (not shown) may be controlled by a control apparatus (not shown).

As mentioned above, the helical spring 118 is in compression and separates the rod 104 from the adjustable end stop 124 when no downward force is being applied to the helical spring. This reduces wear of the adjustable end stop 124 and the helical spring 118. A further advantage of the helical spring 188 is that it may bias the rod 104 to push debris out of the upsetting die after insertion of a fastener. If the threaded plug 134 is unscrewed to allow free movement of the rod 104, then the helical spring 118 will push the rod upwards so that it is proud of the housing 100 thereby allowing the rod to be easily removed from the housing (e.g. to replace the rod). The helical spring 118 may also allow easier assembly of the upsetting die assembly.

Although a helical spring 118 is used to separate the rod 104 from the adjustable end stop 124, any suitable biasing means may be used to separate the rod from the adjustable end stop. Although the biasing means provides the advantage that it allows the adjustable end stop 124 to rotate freely, it is not essential that a biasing means is provided. For example, the rod 104 may rest upon the adjustable end stop 124, the adjustable end stop displacing the rod during rotation of the adjustable end stop.

The adjustable end stop 124 is provided with four substantially flat surfaces onto which the rod 104 may press during operation of the fastening apparatus. In an alternative arrangement the adjustable end stop 124 may be provided with a different number of substantially flat surfaces, for example six substantially flat surfaces, eight substantially flat surfaces or more. The substantially flat surfaces may lie on opposite sides of an axis of rotation of the adjustable end stop 124 such that when a first substantially flat surface is positioned to provide a contact surface for the rod 104 an opposite substantially flat surface is positioned to provide a contact surface for the housing 100. The surfaces of the adjustable end stop 124 onto which the rod 104 presses in use are substantially flat. This is advantageous because it allows a substantially flat lowermost end 122 of the rod 104 to provide a substantial contact area between the rod and the adjustable end stop 124, thereby allowing force applied to the rod during fastener upsetting to be transmitted into the adjustable end stop. It also allows the adjustable end stop 124 to provide a substantial contact area between the adjustable end stop and the bottom surface of the opening 126 of the housing 100, thereby allowing force applied to the adjustable end stop to be transmitted into the housing. The surfaces of the adjustable end stop 124 may have some other suitable shape (i.e. not substantially flat), with the shape of the lowermost end 122 of the rod 104 and the bottom surface of the opening 126 of the housing 100 being appropriately shaped to provide a substantial contact area with the rod.

The actuator (not shown) may be configured to always rotate the adjustable end stop 124 in the same direction (e.g. clockwise as shown in FIGS. 2-4). Alternatively, the actuator maybe configured to rotate the adjustable end stop 124 in both the clockwise and anticlockwise directions.

As described above, the adjustable end stop opening 128 moves vertically during rotation of the adjustable end stop 124. The vertical movement may be half of the change in height of the adjustable end stop 124 caused by the rotation, or may be some other amount (this will depend upon the shape of the adjustable end stop). In some arrangements the adjustable end stop opening 128 may remain stationary in the vertical direction during rotation of the adjustable end stop 124.

The adjustable end stop 124 provides surfaces with different heights upon which the rod 104 rests during upsetting of a fastener. Although the adjustable end stop shown in FIGS. 2-4 has a particular shape, the adjustable end stop may have any suitable shape. The shape may provide different distances between a rod receiving surface of the adjustable end stop and a lowermost surface of the adjustable end stop. An example of an alternative adjustable end stop which has these properties is shown in FIGS. 5 and 6.

FIG. 5 shows in cross-section an upsetting die assembly 264 according to an alternative embodiment of the invention. The upsetting die assembly 264 is similar to the upsetting die assembly shown in FIGS. 2-4, and comprises a housing 200 provided with a generally cylindrical bore 202 within which a rod 204 is provided. The rod 204 includes a substantially flat upper surface 206 and a pip 208 which projects from the substantially flat upper surface. The rod 204 includes a portion having a reduced diameter 210 which connects an upper portion 211 of the rod with a central portion 212, the central portion having a diameter which is substantially equal to the diameter of the upper portion. A lower portion 214 of the rod has a reduced diameter and connects to the central portion 212 at a step 216 at which the diameter of the rod increases. A helical spring 218 abuts against the step 216. An opposite end of the helical spring 218 abuts against a step 220 at which the diameter of the bore 202 reduces. The helical spring 218 resiliently biases the rod 204 upwards. The reduced diameter of the bore 202 substantially corresponds with the diameter of the lower portion 214 of the rod 204. The lowermost end 222 of the rod 204 is bevelled to assist insertion of the rod into the bore 202. A threaded plug 234 extends into the bore 202 and acts to limit upward movement of the rod 204.

The housing 200 is provided with an opening 226. Unlike the embodiment shown in FIGS. 2-4 a rotatable adjustable end stop is not provided in the opening 226, but instead a stepped adjustable end stop 240 is provided in the opening. The stepped adjustable end stop 240 comprises a first substantially planar surface 242 and a second substantially planar surface 244, the first surface being lower than the second surface. The surfaces 242, 244 are provided on a tongue which extends from a block 246 that is connected to an actuator (not shown). The position of the stepped adjustable end stop 240 may be controlled by a control apparatus (not shown).

A step 243 between the first substantially flat surface 242 and the second substantially flat surface 244 is sloped or profiled. The slope or profile of the step 243 may for example correspond with the corner profile of a lowermost end 222 of the rod 204 (as shown in FIG. 5).

The helical spring 218 resiliently biases the rod 204 upwards and away from the stepped adjustable end stop 240. However, when a fastener is being inserted into a workpiece during operation of the fastening apparatus, the rod 204 is pushed downwards and presses against the stepped adjustable end stop 240. The resilient bias provided by the helical spring 218 is less than the force required to upset a rivet, and consequently during upsetting of a rivet the position of the rod within the bore 202 is determined by the position of the stepped adjustable end stop 240. When the stepped adjustable end stop 240 is in a first configuration, as shown in FIG. 5, the rod 204 has a first position which is determined by the height of the first surface 242 of the stepped adjustable end stop. The substantially flat upper surface 206 and pip 208 of the rod 204 together with a collar 230 formed by an upper end of the bore 202 establish an upsetting die having a particular volume. This upsetting die volume may be appropriate for fastening using a rivet having particular dimensions.

If it is desired to use the fastening apparatus to fasten using rivets having different dimensions (e.g. having a shorter shank), then the rod 204 may be moved from the first configuration shown in FIG. 5 to a second configuration shown in FIG. 6. This is achieved by moving the stepped adjustable end stop 240 such that the second surface 244 is located beneath the rod 204. Since the second surface 244 is higher than the first surface 242, the rod 204 is further up the bore 202 when a rivet is being upset. As a consequence of the upward displacement of the rod 204, an upsetting die is formed by the substantially flat upper surface 206, pip 208 and collar 230 which has a smaller volume than the upsetting die formed when the stepped adjustable end stop and rod are in the first configuration.

Although the stepped adjustable end stop 240 shown in FIGS. 5 and 6 is provided with two substantially flat surfaces 242, 244 onto which the rod 204 presses during insertion of fasteners, the stepped adjustable end stop may be provided with three, four, five, six or more substantially flat surfaces.

Although the surfaces 242, 244 are described as being substantially flat, the surfaces may have some other form. The lowermost end 222 of the rod 204 may have a corresponding form (e.g. selected to provide a substantial contact area between the rod and the stepped adjustable end stop).

The helical spring 218 is used to separate the rod 204 from the stepped adjustable end stop 240 and provides the advantage that it allows the stepped adjustable end stop 240 to move freely. Although a helical spring 218 is shown, any suitable biasing means may be used to separate the rod 204 from the stepped adjustable end stop 240. It is not essential that a biasing means is provided. For example, the rod 204 may rest upon the stepped adjustable end stop 240, the adjustable end stop displacing the rod during movement of the adjustable end stop.

Figure 7:
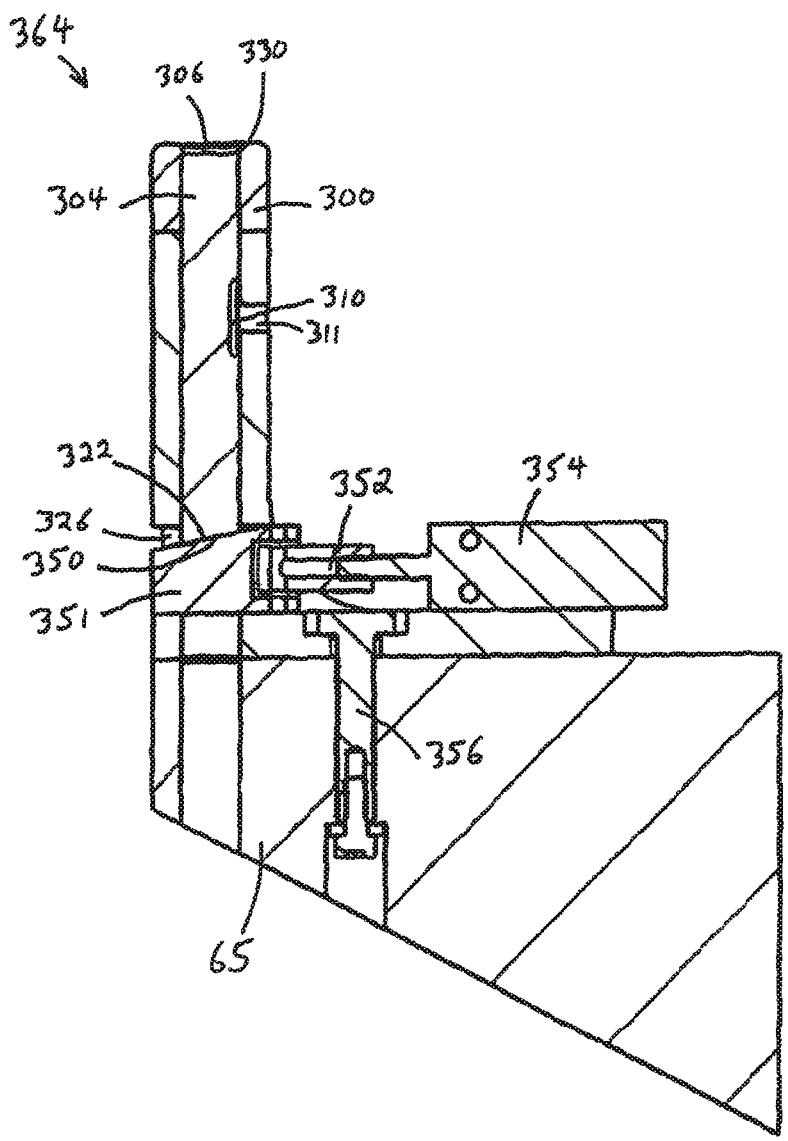
FIG. 7 is a cross-sectional view of part of an upsetting die assembly according to a third embodiment of the invention.

A third embodiment of the invention is shown in cross-section in FIG. 7. FIG. 7 shows part of a fastener upsetting die assembly 364 held on a lower jaw 65 of a C-frame. A rod 304 is held within a housing 300 which is connected to the lower jaw 65 of the C-frame by bolts 356. A substantially flat upper surface 306 of the rod and a collar 330 form an upsetting die. In this embodiment the rod 304 is not provided with a pip at an uppermost surface. However, a pip may be provided. The rod includes a reduced diameter portion 310 which may receive a plug (not shown) which passes through a threaded bore 311 in the housing 300 (the plug being used to retain the rod and/or limit movement of the rod if desired). Although this embodiment does not include a spring which biases the rod 304 upwards, a spring may be provided.

A lowermost end 322 of the rod 304 rests upon a sloped surface 350 of an adjustable end stop which comprises a sloped cam 351. The lowermost end 322 of the rod may be considered to be a cam follower. A biasing means (not shown) may be provided to bias the rod 304 against the sloped cam 351. The sloped cam 351 is located in an opening 326 in the housing 300 and is translatable in a direction which is substantially perpendicular to the direction of movement of the rod 304. The cam 351 is moved using an actuating rod 352 which is controlled by an actuator 354 (e.g. a pneumatic cylinder, piezo-electric actuator, stepper-motor or the like). Movement of the cam 351 by the actuator 354 may be controlled by a control apparatus (not shown). The opening 326 which receives the sloped cam 351 is sufficiently large to allow the sloped cam to be inserted into the opening with a range of positions which provide a desired range of positions of the rod 304.

The lowermost end 322 of the rod 304 is provided with a slope which substantially corresponds to the sloped surface 350 of the sloped cam 351. This allows substantially all of the lowermost end 322 of the rod 304 to be in contact with the sloped surface of the sloped cam 351. This is advantageous because it allows force applied to the rod 304 during fastening to be transmitted to the sloped cam 351 over a relatively large surface area (compared with the surface area if only a small portion of the lowermost end of the rod was in contact with the sloped cam).

In use, the height of an upper end of the rod 304, and thus the volume of an upsetting die formed by the uppermost surface 306 of the rod and the collar 330 of the housing, is controlled by the position of the sloped cam 351. When the sloped cam 351 is moved such that the sloped surface 350 pushes the rod 304 upwards then this reduces the volume of the upsetting die. Conversely, when the sloped cam is moved such that the sloped surface 350 allows the rod 304 to move downwards this increase the volume of the upsetting die.

Unlike the embodiments shown in FIGS. 2-6, the sloped cam 351 allows more than two positions of the rod 304 to be selected. The sloped cam 351 may allow variation in a continuous manner of the position of the rod 304. This may in turn allow variation in a continuous manner of the volume of the upsetting die formed using the rod 304.

In the embodiments shown in FIGS. 2-6 the lowermost end 122, 222 of the rod 104, 204 rests upon a substantially flat surface when fastening is performed by the fastener. Consequently, when force is applied by a punch onto the rod 104, 204 during fastening, this force is transmitted downwards through the adjustable end stop 124, 240 and does not include a component which tends to induce movement of the adjustable end stop. In contrast to this, in the embodiment shown in FIG. 7 a component of force exerted on the rod 304 during a fastening operation may act to push the sloping cam 351 towards the actuator 354. The surface 350 of the sloping cam 351 and/or the lowermost end 322 of the rod 304 may have a surface finish which generates friction between them (for example a rough surface finish), thereby inhibiting horizontal movement of the cam when downwards force is exerted on the rod. If the friction which is generated is sufficiently high, this may prevent horizontal movement of the cam 351 during insertion of a fastener. The angle of the sloping surface 350 of the sloping cam 351 will determine what proportion of force exerted on the rod 304 tends to push the sloping cam 351 towards the actuator 354. The slope may be selected to be sufficiently shallow that the force exerted on the rod 304 during a fastening operation is not sufficient to cause movement of the sloping cam 351 (taking in to account the friction which is provided by the surface finish of the cam and/or the lowermost end 322 of the rod 304). Additionally or alternatively, the actuator 354 may be configured to withstand force exerted upon it during a fastening operation.

Figure 8:
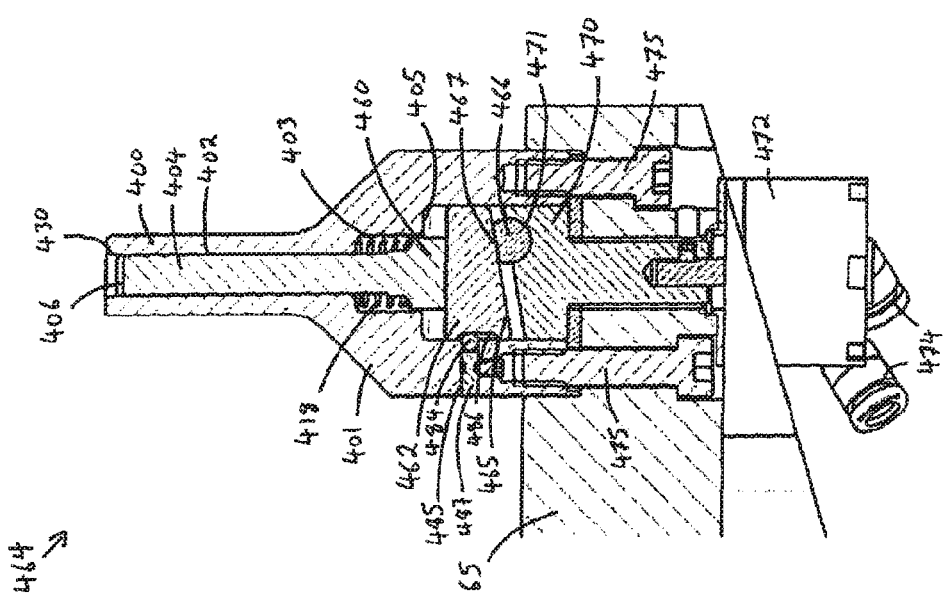
FIG. 8 is a cross-sectional view of an upsetting die assembly according to a fourth embodiment of the invention in a first configuration.

FIG. 8 shows in cross-section an upsetting die assembly 464 according to a further alternative embodiment of the invention. Also shown in FIG. 8 is part of a lower jaw 65 of a C-frame (see FIG. 1) to which the upsetting die is attached. The upsetting die assembly 464 comprises a rod 404 located in a bore 402 formed in a housing 400. A substantially flat upper surface 406 of the rod together with a collar 430 formed by an upper end of the bore 402 forms an upsetting die. Although no pip is shown on the upper surface 406 of the rod 404, a pip or other shaped feature may be provided. The bore 402 includes a step 405 at a lower portion 403 which increases the diameter of the bore such that it may accommodate a helical spring 418. The rod 404 includes a lower portion with an increased diameter 460. The helical spring 418 abuts against the increased diameter portion 460 of the rod 404 and against the step 405 in the bore 402. The helical spring 418 is under compression and resiliently biases the rod 404 downwards and into the bore 402.

A cam follower 462 is provided at a lowermost end of the rod 404. The cam follower has a sloped surface 465 which is configured to cooperate with a ball 466 which forms part of an actuation apparatus. The ball 466 is provided with a flat surface 467 which is in contact with the sloped surface 465 of the cam follower 462. The actuation apparatus comprises a cam 470 which is connected to a rotary actuator 472, the ball 466 being held in a recess 471 provided in the cam. Rotation of the cam 470 by the actuator 472 may be controlled by a control apparatus (not shown). The cam 470 may be considered to be an adjustable end stop.

The rotary actuator 472 may for example be pneumatic, and may thus include connectors 474 configured to allow pneumatic pressure to pass to the rotary actuator and control its orientation. Alternatively, the rotary actuator 472 may be electric (for example the rotary actuator may be a stepper-motor).

The cam follower 462 and rod 404 are free to move in the axial direction (i.e. up and down), but are not free to rotate. Rotation of the cam follower 462 is prevented by a ball 484 which projects from a horizontal bore 485 in the housing 401 and which is received in a vertically oriented slot 486 in the cam follower 462. The ball 484 is held in place by a plug 487 provided in the horizontal bore 485. Thus, rotation of the cam 470 does not cause the cam follower 462 to rotate but instead forces the cam follower 462 to move up and down. The ball 466 is free to rotate in the recess 471 of the cam 470, thereby allowing the flat surface 467 of the ball to remain in contact with the sloped surface 465 of the cam follower 462. Allowing the flat surface 467 of the ball 466 to remain in contact with the sloped surface 465 of the cam follower 462 in this way is advantageous because the flat surface provides a surface area through which force may be transmitted during insertion of a fastener into a workpiece.

The housing 400 includes a flared lowermost portion 401, part of which is received in the lower jaw 65 of the C-frame. Bolts 475 are used to secure the housing 400 to the lower jaw 65.

Figure 9:
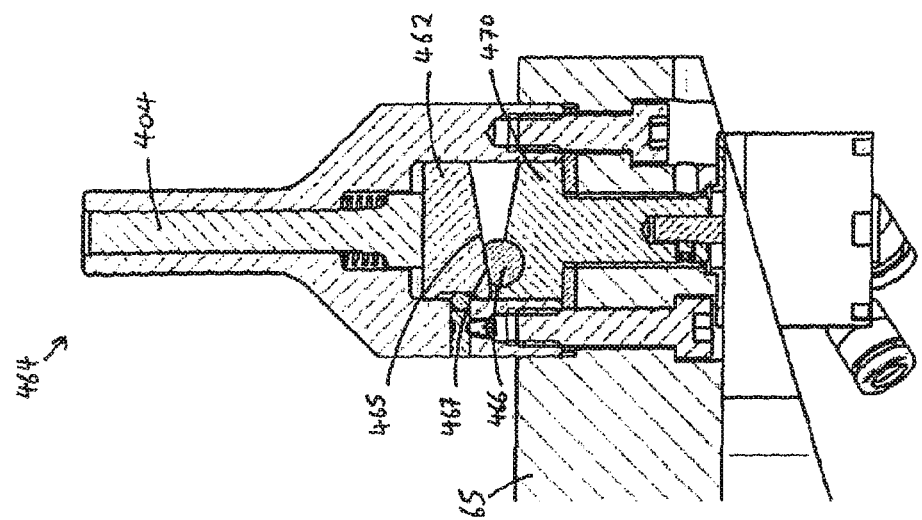
FIG. 9 is cross-sectional view of the upsetting die assembly of FIG. 8 in a second configuration.

In use, the cam 470 is rotated using the rotary actuator 472, whereupon the ball 466 either pushes the rod 404 upwards or allows the rod 404 to move downwards under bias of the helical spring 418 via the interaction of the flat surface 467 of the ball 466 with the sloped surface 465 of the cam follower 462. When the rotary actuator is in the configuration shown in FIG. 8, the flat surface 467 of the ball 466 is in contact with a thinnest portion of the sloped surface 465 of the cam follower 462. The rod 404 thus is withdrawn to a maximum extent into the bore 402, thereby forming an upsetting die having a maximum volume (as determined by the position of the substantially planar upper surface 406 of the rod). FIG. 9 shows the upsetting die assembly 64 when the cam 470 has been rotated through 180°. As may be seen from FIG. 9, the flat surface of the ball 467 is now in contact with the thickest portion of the sloped surface 465 of the cam follower 462. The ball 466 has thus pushed the cam follower 462 and the rod 404 upwards to a maximum extent, thereby forming an upsetting die which has a minimum volume. The rotary actuator 472 may move the cam 470 to orientations which are intermediate the orientations shown in FIGS. 7 and 8, thereby forming upsetting dies having other volumes. The rotary actuator 472 and cam 470 may allow variation in a continuous manner of the position of the rod 404. This may in turn allow variation in a continuous manner of the volume of the upsetting die formed using the rod 404.

The helical spring 418 ensures that the cam follower 462 remains in contact with the ball 466 when the cam 470 is rotating, thereby ensuring that the orientation of the ball changes such that the flat surface 467 of the ball remains pressed against the cam follower.

The actuator 472 may be capable of rotating the cam 470 through 360°. A movement of 2.5 mm of the rod 404 within the bore 402 may for example be obtained through rotation of the cam 470 through 180°.

Figure 10:
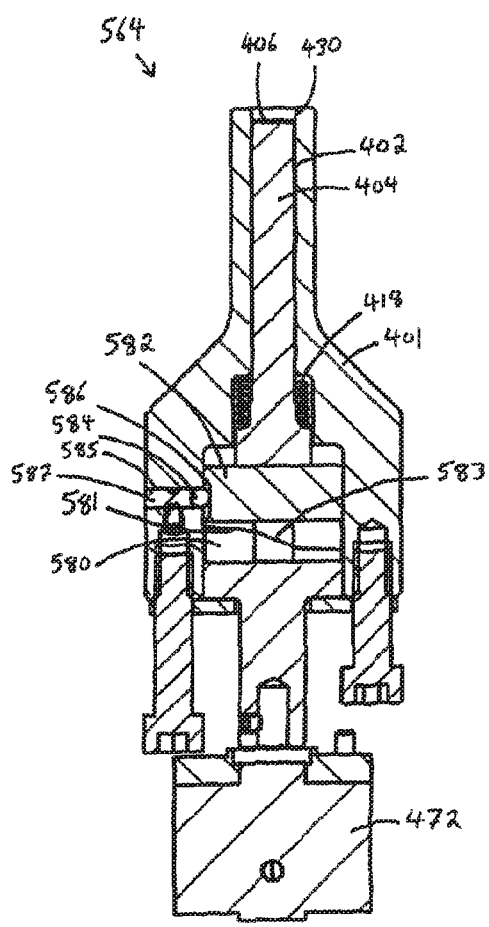
FIG. 10 is a cross-sectional view of an upsetting die assembly according to a fifth embodiment of the invention in a first configuration.
Figure 11:
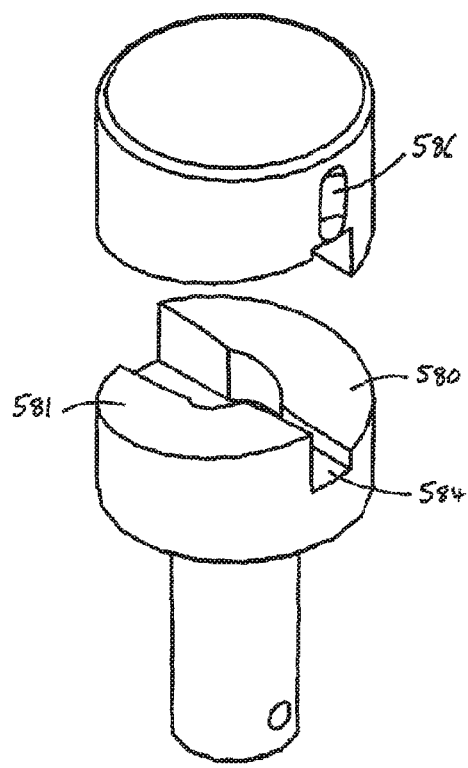
FIG. 11 is an exploded view of part of the upsetting die assembly of FIG. 10.
Figure 12:
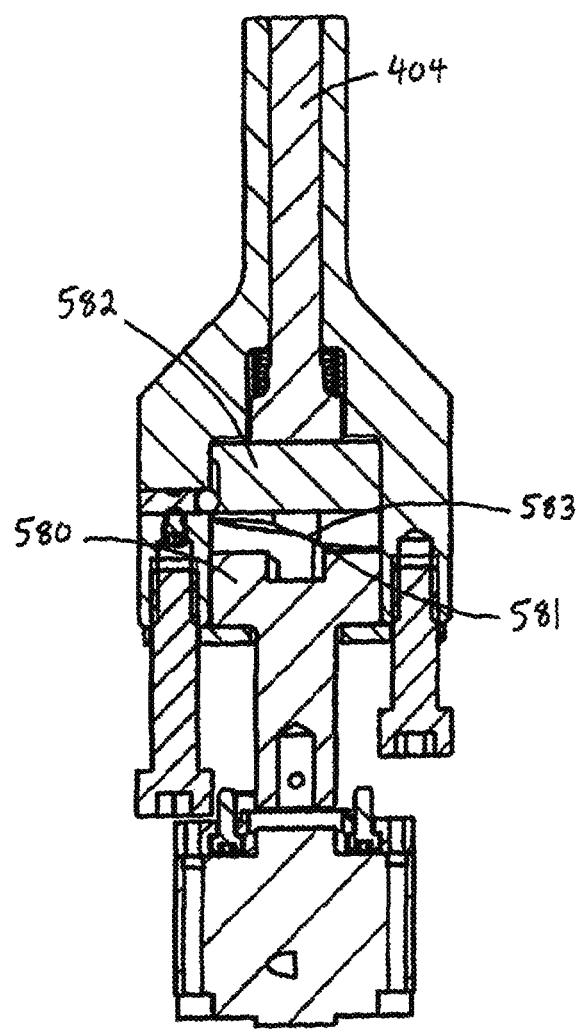
FIG. 12 is a cross-sectional view of the upsetting die of FIG. 10 in a second configuration.

An upsetting die assembly 564 according to a further alternative embodiment of the invention is shown in FIGS. 10-12. The upsetting die corresponds generally with the upsetting die assembly 64 shown in FIGS. 8 and 9, and corresponding reference numerals are used for corresponding components. In this embodiment a cam 580 and a cam follower 582 are provided. The cam 580 may be considered to be an example of an adjustable end stop. However, no ball is provided between the cam 580 and the cam follower 582. Instead, the cam 580 and cam follower 582 are provided with surfaces 581, 583 which have corresponding shapes, the shapes comprising partial helixes. FIGS. 10 and 12 show the upsetting die assembly in cross-section in a first configuration and a second configuration. FIG. 11 shows the cam 580 and cam follower 582 in an exploded perspective view (the cam and cam follower being in the first configuration). The orientation of the cam 580 may be controlled by a control apparatus (not shown).

As may be seen from FIG. 11, the surface 581 of the cam 580 comprises two partial helixes, each of which extends for just under 180°. The partial helixes are separated by a slot 584 which extends between them. The slot 584 may allow easier manufacturing of the cam surface 581 than would be the case if the slot were not present. The surface 583 of the cam follower 582 has a shape which corresponds with the shape of the surface 581 of the cam 580.

In common with the embodiments shown in FIGS. 8 and 9, the cam follower 582 is free to move in the axial direction but is not free to rotate. Rotation of the cam follower 582 is prevented by a ball 584 which projects from a horizontal bore 585 in the housing 401. A plug 587 holds the ball 584 in the horizontal bore 585. The ball 584 is received in a vertically oriented slot 586 in the cam follower 582 and prevents the cam follower from rotating.

When the cam 580 has the orientation shown in FIG. 10, the surfaces 581,583 of the cam and the cam follower 582 are fully in contact with one another, and the cam follower 582 is at a lowermost position such that the rod 404 is withdrawn into the bore 402 to a maximum extent. An upsetting die having a maximum volume is thus formed by a substantially planar upper surface 406 of the rod and a collar 430 formed by an uppermost end of the bore 402. Rotation of the cam 580 is controlled by an actuator 472 which in turn is controlled by a control apparatus (not shown). When the cam 580 is rotated through for example 90°, as is shown in FIG. 12, a relatively thick portion of the cam follower 582 is in contact with a relatively thick portion of the cam 580. As a result, the cam follower 582 and the rod 404 are pushed upwards. An upsetting die having a reduced volume is thus formed by a substantially planar upper surface 406 of the rod and a collar 430 formed by an upper most end of the bore 402. The construction of the surfaces 581, 583 using pairs of partial helixes provides the advantage that force being exerted on the rod 404 during a fastening operation is transmitted through the cam surfaces on either side of a central axis which passes through the rod.

Rotation of the cam 580 by 90° may for example reduce the depth of the upsetting die by 3 mm. The depth may for example be reduced from 3 mm to 0 mm. Where this is the case, upsetting die depth increments of 0.25 may be obtained by rotating the cam 580 by 7.5°.

The cam 580 may be moved to orientations which are intermediate the orientations shown in FIGS. 10 and 12, thereby forming upsetting dies having other volumes. The cam 580 may thus allow variation in a continuous manner of the position of the rod 404. This may in turn allow variation in a continuous manner of the volume of the upsetting die formed using the rod 404.

The embodiment shown in FIGS. 10-12 includes a helical spring 418 which is under compression and keeps the surfaces 581, 583 pressed against each other. The helical spring is not necessary and the helical spring may be omitted, although this may allow the cam follower to move in an uncontrolled manner within the housing 401 (for example during movement of the fastening apparatus between fastening locations).

The surfaces of the cam and cam follower may have a shape which differs from the shape shown in FIGS. 10-12. The surfaces may be rotationally symmetric for a rotation of around 180° about an axis which passes through the rod (e.g. two surfaces being provided on the cam). This will provide the advantage that force being exerted on the rod 404 during a fastening operation is transmitted through cam surfaces on either side of the axis. The surfaces may be rotationally symmetric for a rotation of around 120° (or some other rotation) about an axis which passes through the rod (e.g. three or more surfaces being provided on the cam). This will provide the advantage that force being exerted on the rod 404 during a fastening operation is transmitted through cam surfaces which are distributed around the axis.

In a further alternative embodiment of the invention (not illustrated) the adjustable end stop may comprise a threaded shaft that is held in a threaded housing. The adjustable end stop may be moved axially within the housing by driving the adjustable end stop to rotate using a rotary actuator. The axial movement of the adjustable end stop may cause axial movement of the rod which forms part of the upsetting die, thereby changing the volume of the upsetting die. This may allow variation in a continuous manner of the position of the rod. This may in turn allow variation in a continuous manner of the volume of the upsetting die formed using the rod.

In a further alternative embodiment of the invention (not illustrated) the rod which forms part of the upsetting die may be threaded and the bore in which the rod is held may be correspondingly threaded. In this embodiment the rod may be moved axially within the bore by driving the rod to rotate using a rotary actuator. This may allow variation in a continuous manner of the position of the rod. This may in turn allow variation in a continuous manner of the volume of the upsetting die formed using the rod.

Figure 14:
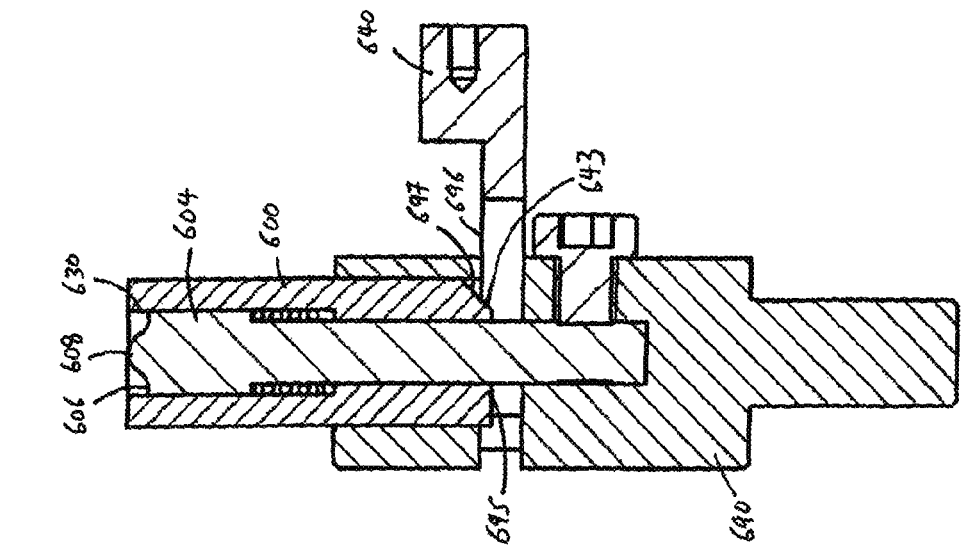
FIG. 14 is a cross-sectional view of the upsetting die assembly of FIG. 13A in a second configuration.

In a further alternative embodiment, instead of moving the rod within the bore to change the volume of the upsetting die, the rod may be held stationary and the housing which defines the bore may be moved over the rod to change the volume of the upsetting die. An example of this is shown in FIGS. 13 and 14. Referring to FIG. 13A, an upsetting die assembly 664 comprises a rod 604 provided within a bore 602 in a housing 600. The rod 604 extends beyond a lowermost end of the housing 600 and is held in a support structure 690. The support structure 690 may be held in a lower jaw of a C-frame (not shown). The rod 604 is received in a bore 691 formed in the support structure 690. A threaded bore 632 is provided on one side of the support structure 690, and a threaded plug 634 is held in the threaded bore. The threaded plug 634 extends into a reduced diameter section 692 of the rod 604. The threaded plug 634 thus holds the rod in the support structure 690 and prevents it from falling out of the support structure. The diameter of the rod 604 reduces at a step 616. A helical spring 618 abuts against the step 616. An opposite end of the helical spring 618 abuts against a step 620 at which the diameter of the bore 602 reduces.

The support structure 690 is provided with an opening 693, and a cam 640 is provided in the opening. The cam 640 may be considered to be an example of an adjustable end stop. The cam 640 is forked and is provided with arms 694 which extend either side of the rod 604. Although only one of the forks 694 is shown in FIG. 13A, both of the forks 694 may be seen in FIG. 13B. Each of the forks 694 comprises a first substantially planar surface 695 and a second substantially planar surface 696. The first surface 695 is lower than the second surface 696. The arms 694 extend from a block 646 which is connected to an actuator (not shown). The position of the cam 640 may be controlled by a control apparatus (not shown).

The housing 600 is vertically moveable relative to the rod 604 and the support structure 690. A lowermost surface of the housing 600 is in contact with the cam 640. The helical spring 618 resiliently biases the housing 600 downwards, thereby pushing the housing against the cam 640.

Figure 13B:
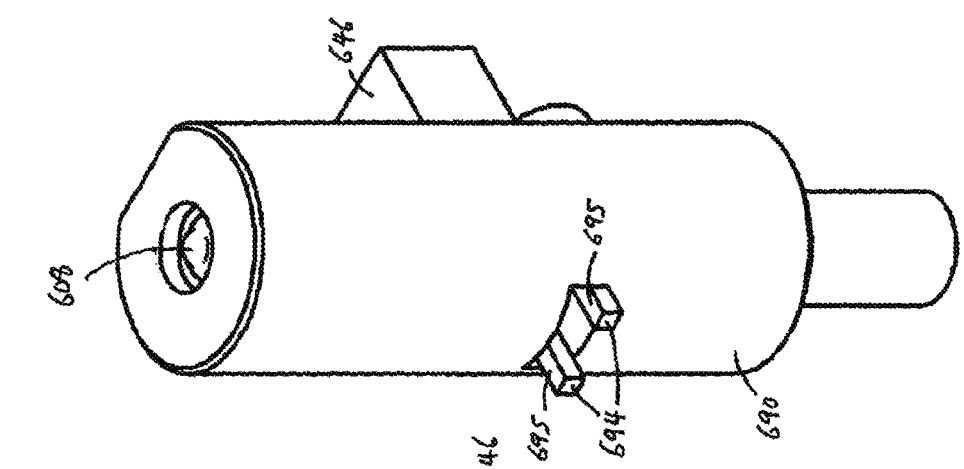
FIGS. 13A and 13B are a cross-sectional view and a perspective view of an upsetting die assembly according to an alternative embodiment of the invention in a first configuration.
Figure 13A:
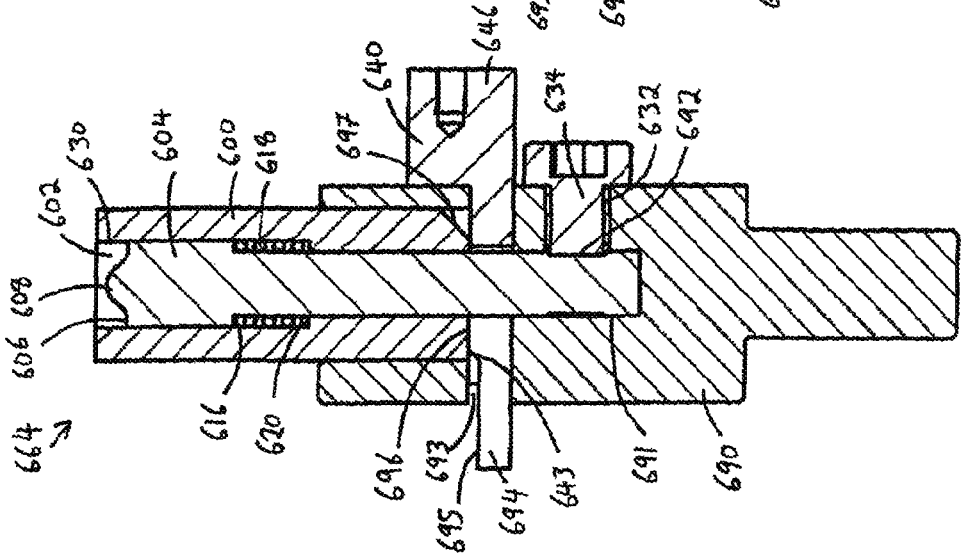

In use, as shown in FIG. 13A and FIG. 13B, the cam 640 may have a position in which the second surface 696 of the arms 694 is located beneath the housing 600. The height of the housing 600 is thus determined by the height of the second surface 696 of the cam 640. An upsetting die is formed by a substantially flat upper surface 606 of the rod 604, a pip 608 provided on the rod, and a collar 630 formed by an upper end of the housing 600. The upsetting volume of the upsetting die is determined by the height of the housing 600, which in turn is determined by the height of the second surface 696 of the cam 640.

If it is desired to use the fastening apparatus to fasten using a rivet having different dimensions (e.g. having a shorter shank), then the housing 600 may be moved from the first configuration as shown in FIGS. 13A and 13B to a second configuration as shown in FIG. 14. This is achieved by moving the cam 640 such that the second surface 695 of the arms 694 is located beneath the housing 600. Since the second surface 694 is lower than the first surface 696, the housing 600 is moved downwards relative to the rod 604 thereby forming an upsetting die with a smaller upsetting volume.

A step 643 between the first surface 695 and the second surface 696 of the arms 694 is sloped. The slope of the step 643 may for example correspond with a sloped edge provided at a lowermost end of the housing 600. The sloped surface of the step 643 and the sloped surface of the housing may allow the cam 640 to push the housing 600 upwards when the cam moves from the configuration shown in FIG. 14 to the configuration in FIGS. 13A and 13B.

Although the arms 694 of the cam 640 each have two surfaces 695, 696 upon which the housing 600 may rest, the arms may be provided with a different number of surfaces. For example, each arm may be provided with three, four, five, six or more surfaces.

Although the surfaces 695, 696 are shown as being substantially flat, the surfaces may have some other form. The lowermost end of the housing 600 may have a corresponding form (e.g. selected to provide a substantial contact area between the housing and the surfaces).

Although a helical spring 618 is shown, any suitable biasing means may be used. It is not essential that a biasing means is provided.

Figure 15:
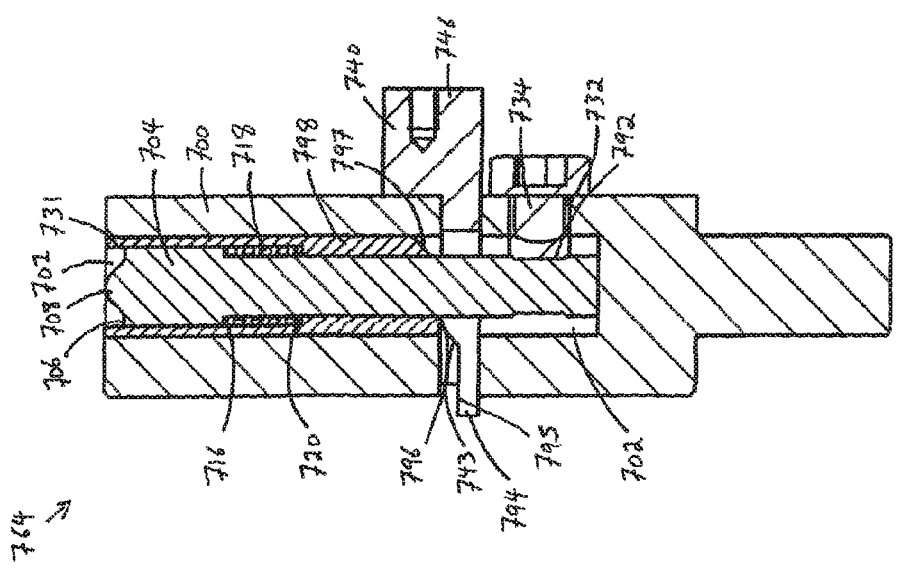
FIG. 15 is a cross-sectional view of an upsetting die assembly according to an alternative embodiment of the invention in a first configuration.

FIG. 15 shows in cross-section an upsetting die assembly 764 according to a further alternative embodiment of the invention. The upsetting die assembly 764 is similar to the upsetting die assembly shown in FIGS. 13-14, but provides a change of diameter of the upsetting die instead of providing a change of depth. A rod 704 is provided in a bore 702 in a housing 700. The housing 700 is provided on a lower jaw of a C-frame (not shown). A movable sleeve 798 is provided between the 704 and the housing 700. Unlike the embodiment shown in FIGS. 13 and 14, the housing 700 is not moveable. An opening 793 is provided in the housing 700, the opening receiving arms 794 of a cam 740. The cam 740 may be considered to be an example of an adjustable end stop. The arms 794 extend either side of the rod 704. Each arm comprises a first surface 795 and a second surface 796, the first surface 795 being lower than the second surface 796. Each arm 794 is connected to a block 746 which is connected to an actuator (not shown). The position of the cam 740 may be controlled by a control apparatus (not shown). A step 743 is provided between the first surface 795 and the second surface 796 of each arm 794. The step 743 has a slope which substantially corresponds with a slope 797 provided at a lowermost surface of the sleeve 798.

The rod 704 is provided with a step 716 against which one end of a helical spring 718 abuts. The sleeve 798 is provided with a step 720 against which an opposite end of the helical spring 718 abuts. The helical spring biases the sleeve 798 downwards such that the sleeve pushes against the arms 794 of the stepped cam 740.

The rod 704 is held in the bore 720 by a threaded bolt 734 which is received in a threaded bore 732 provided in a side of the housing 700. The threaded bolt 734 is received in a reduced diameter section 792 of the rod 704, and prevents the rod from falling out of the housing 700. The length of the threaded bolt 734 may be selected such that it extends into the reduced diameter section 792 of the rod 704 without pressing against the rod (e.g. to avoid bending the rod). Although the bore 702 shown in FIG. 14 is significantly wider than the rod 704, the bore 702 may be narrower and may for example have a diameter which is sufficiently narrow that it prevents significant lateral movement of the rod 702

A substantially flat upper surface 706 of the rod 704 together with a pip 708 and a collar 731 formed by the sleeve 798 form an upsetting die. It may be desired to change the upsetting volume of the upsetting die, for example to use the fastening apparatus to fasten using rivets having different dimensions (e.g. having a longer or wider shank). This may be achieved by moving the sleeve 798 from the first configuration shown in FIG. 15 to a second configuration shown in FIG. 16. This is done by moving the cam 740 such that the first surface 795 of the arms 794 is located beneath the sleeve 798 instead of the second surface 796. Since the first surface 795 is lower than the second surface 796, the sleeve 798 moves downwards under the resilient bias of the helical spring 718. As a result of the downward displacement of the sleeve 798, an upsetting die is formed with an increased diameter (and hence an increased upsetting volume). The upsetting die is formed by a substantially flat upper surface 706 of the rod, an upper surface 799 of the sleeve 798, the pip 708 and a collar 730 formed by the housing 700. The height of the first surface 795 of the cam 740 is chosen such that the upper surface 799 of the sleeve 798 is aligned with (or substantially aligned with) the substantially flat upper surface 706 of the rod 704 when the fastening apparatus is in the configuration shown in FIG. 16.

The slope of the step 743 and the slope 797 provided at the lowermost end of the sleeve 798 may be the same or may be substantially the same. The slopes may provide upward movement of the sleeve 798 when moving the stepped cam 740 from the second configuration (shown in FIG. 16) to the first configuration (shown in FIG. 15).

Although the arms 794 of the cam 740 each have two surfaces 795, 796 upon which the sleeve 798 may rest, the arms may be provided with a different number of surfaces. For example, each arm may be provided with three, four, five, six or more surfaces. Although the surfaces 795, 796 are shown as being substantially flat, the surfaces may have some other form. The lowermost end of the sleeve 600 may have a corresponding form (e.g. selected to provide a substantial contact area between the housing and the surfaces).

Although a helical spring 718 is shown, any suitable biasing means may be used. It is not essential that a biasing means is provided.

Figure 17:
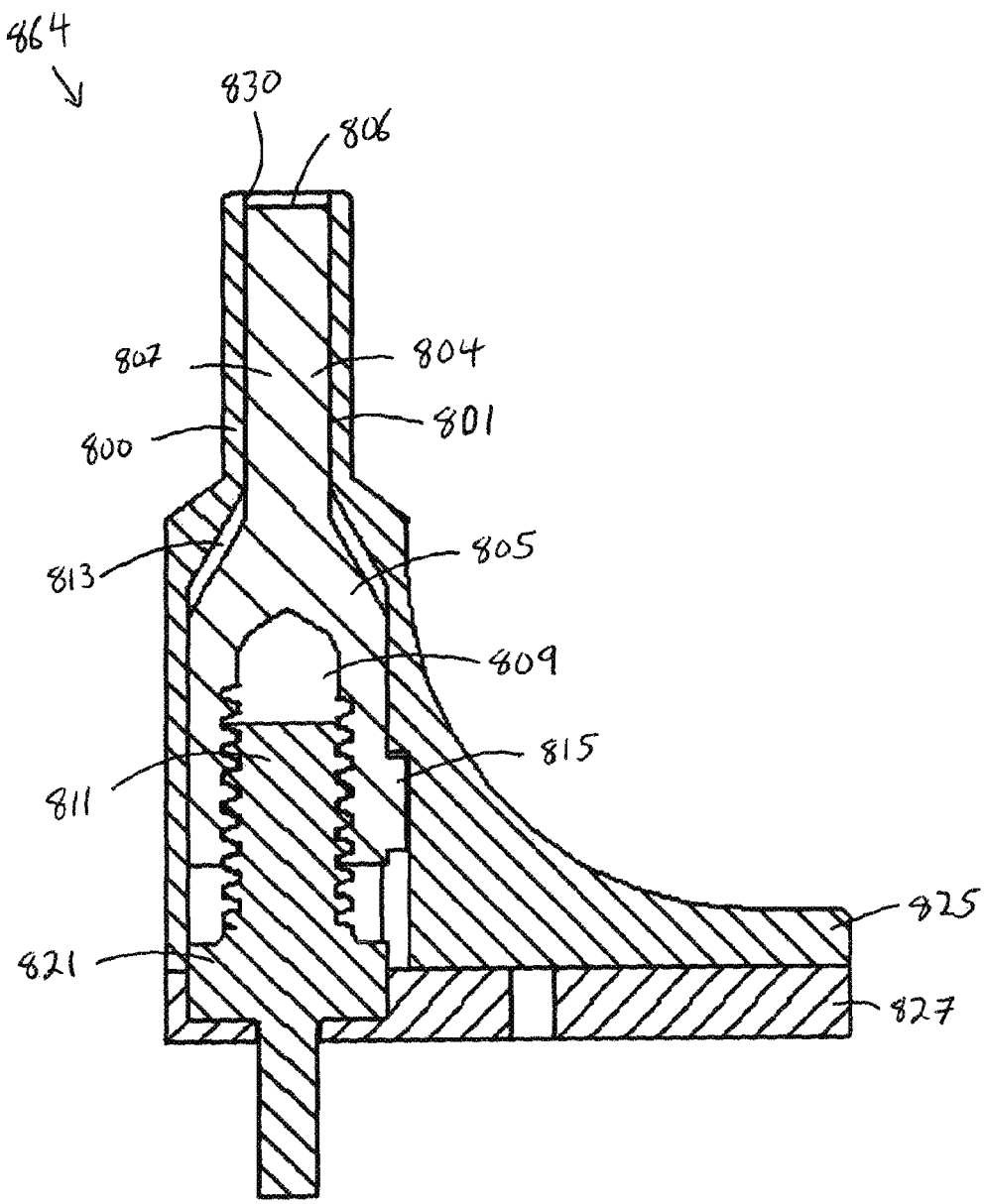
FIG. 17 is a cross-sectional view of an upsetting die assembly according to an alternative embodiment of the invention.

A further alternative embodiment of the invention is shown in cross-section in FIG. 17. FIG. 17 shows part of a fastener upsetting die assembly 864 which may be held on a lower jaw of a C-frame (not shown). A rod 804 is held within a bore 801 within a housing 800. A substantially flat upper surface 806 of the rod and a collar 830 form an upsetting die. In this embodiment the rod 804 is not provided with a pip at an uppermost surface. However, a pip may be provided. The housing 800 is formed in two parts, an upper part 825 and a lower part 827.

An outwardly tapering portion 805 is located at the bottom of an upper portion 807 of the rod 804, the rod 804 having an increased diameter beneath the outwardly tapering portion. A bore 809 which begins at a bottom end of the rod 804 extends into the rod. The bore 809 is threaded and receives a correspondingly threaded bolt 811.

The bore 801 in the housing 800 includes a tapering portion 813, the tapering portion generally corresponding with the tapering portion 805 of the rod 804. The bore tapering portion 813 acts to prevent the rod 804 from moving upwards within the bore 801 beyond a position at which the rod tapering portion 805 comes into contact with the bore tapering portion.

The bore 813 is not threaded, and is configured to allow the rod 804 to freely move axially within the bore (until the shoulder 805 comes into contact with the step 813). The rod 804 includes a protrusion 815 which is received in a correspondingly shaped recess of the bore 801. The protrusion 815 is provided on only one side of the rod 804 and the recess is similarly only provided on one side of the bore 801. As a result, the protrusion 815 prevents the rod 804 from rotating within the bore 801. In general, at least part of the rod and the bore may have any non-circular cross-sectional shape, thereby preventing the rod from rotating within the bore.

A lower end of the bolt 811 extends through the bottom of the housing 800. A rotating actuator (not shown) may be connected to the lower end of the bolt and used to rotate the bolt. The rotating actuator may be controlled by a control apparatus (not shown).

The bolt 811 is provided with an intermediate portion 821 with an increased diameter. The housing 800 may include a corresponding portion with a corresponding diameter (although this is not shown). The intermediate portion 821 of the bolt 811 and the corresponding portion of the housing 800 will act to retain the bolt within the housing and to substantially prevent axial movement of the bolt within the housing. Although axial movement of the bolt within the housing is substantially prevented, the bolt is free to rotate within the housing when it is driven to rotate by the rotating actuator 819.

In use, the volume of the upsetting die formed by the flat upper surface 806 of the rod 804 and the collar 830 is selected by rotating the rotating actuator and thereby rotating the bolt 811. Due to the threaded connection between the bolt 811 and the bore 809 of the rod 804, and because the protrusion 815 prevents the rod from rotating, rotation of the bolt will force the rod to move axially within the housing 800. Thus, rotation of the bolt 811 in a first direction (e.g. clockwise) will cause the rod 804 to move upwards, thereby reducing the volume of the upsetting die. Rotation of the bolt 811 in the opposite direction will cause the rod 804 to move downwards in the housing, thereby increasing the volume of the upsetting die. This allows the volume of the upsetting die to be modified as desired, for example to accommodate different fastening conditions (e.g. rivets having different dimensions).

Figure 18:
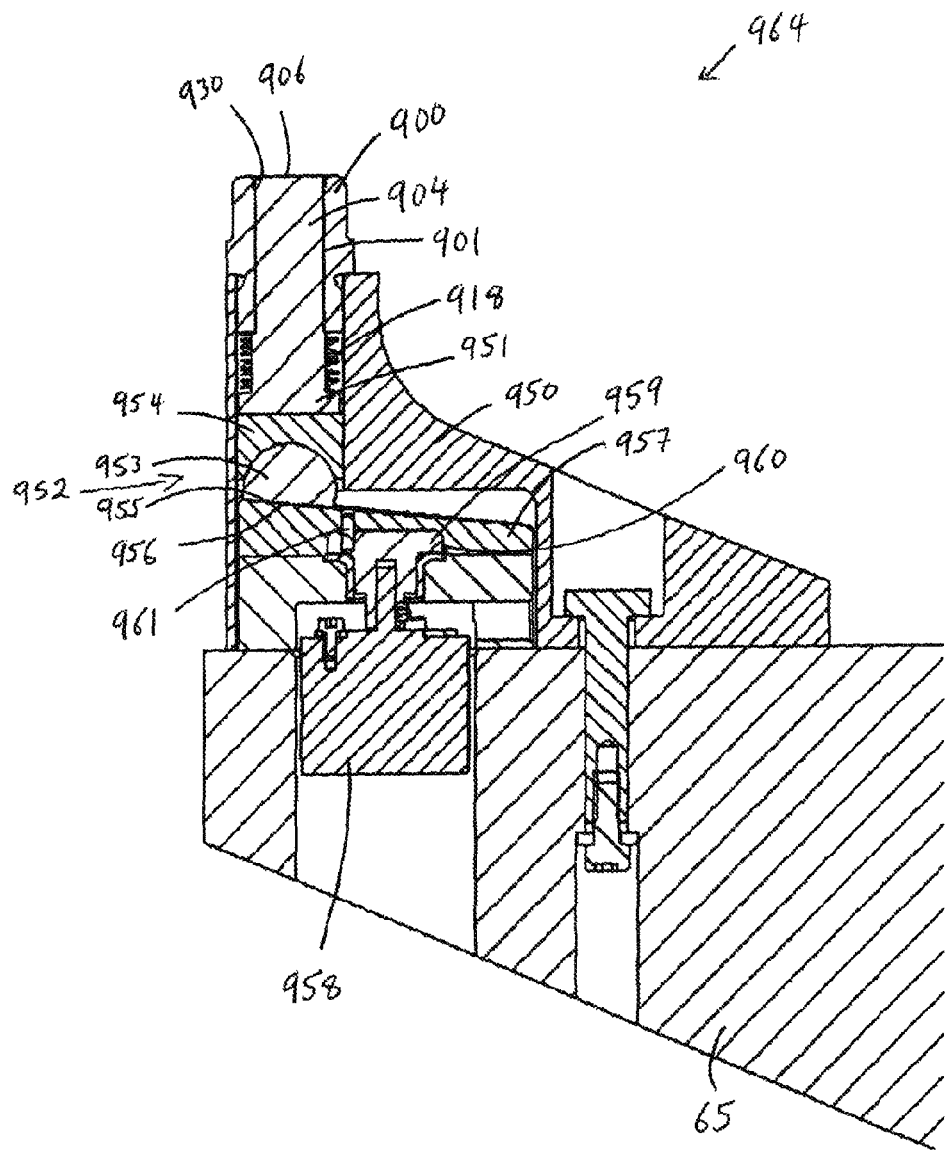
FIG. 18 is a cross-sectional view of an upsetting die assembly according to an alternative embodiment of the invention.

A further alternative embodiment of the invention is shown in cross-section in FIG. 18. FIG. 18 shows part of a fastener upsetting die assembly 964 which may be held on a lower jaw 65 of a C-frame. A rod 904 is held within a bore 901 in a housing 900. A substantially flat upper surface 906 of the rod and a collar 930 form an upsetting die. In this embodiment the rod 904 is not provided with a pip at an uppermost surface. However, a pip may be provided.

The housing 900 is secured to a support 950 which is in turn secured to the lower jaw 65 of the C-frame. The rod 904 is free to move axially within the housing 900. A lower portion of the rod 94 projects out of a bottom end of the bore 901. A flange 951 is provided at a lowermost end of the rod 904. A spring 918 extends between the flange 951 and a lowermost end of the housing 900, the spring being configured to resiliently bias the flange 951 (and hence the rod) away from the lowermost end of the housing.

A cam follower 952 is provided at a lowermost end of the rod 904. The cam follower comprises a ball 953 which is received in a recess in a holder 954. The ball 953 has a sloped surface 955 which is configured to cooperate with a sloped cam surface 956 of a cam 957. The cam 957 is configured to rotate about an axis of rotation. The cam 957 may be considered to be an adjustable end stop. Although the cam follower comprises a ball 953 in a recess in this embodiment, any suitable cam follower may be used.

The cam 957 is driven to rotate by an electric motor 958 (or other suitable actuator) which his connected to the lower jaw 65 of the C-frame. A cap 959 is attached to the electric motor 958 such that the cap is rotated by the electric motor. The cap 959 is received in an opening 960 in the cam 957, a pin 961 being used to secure the cap to the cam. The cam 957 is thereby securely attached to the cap 959 such that the cam is forced to rotate with the cap. The cam 957 thus rotates when the electric motor 958 rotates.

The electric motor 958 includes an encoder which monitors the orientation of the electric motor, and hence monitors the orientation of the cam 957. The encoder is connected to control apparatus (not shown) of the fastener apparatus, and provides feedback regarding the orientation of the electric motor 958 (thereby providing feedback regarding the orientation of the cam 957). This allows the control apparatus to accurately control the orientation of the cam 957.

In use, the volume of the upsetting die formed by the flat upper surface 906 of the rod 904 and the collar 930 is selected by rotating the cam 957 using the electric motor 958. Because the cam surface 956 of the cam 957 is sloped, rotation of the cam in a first direction will cause the ball 953 and rod 904 to move downwards under the resilient bias of the spring 918, and rotation of the cam in an opposite direction will cause the ball and rod to move upwards against the resilient bias of the spring. Thus, the position of the rod 904 in the housing 900 may be controlled using the electric motor. This allows the upsetting die to be modified as desired, for example to accommodate different fastening conditions (e.g. rivets having different dimensions). The volume of the upsetting die is thus controlled by the control apparatus.

Figure 19A:
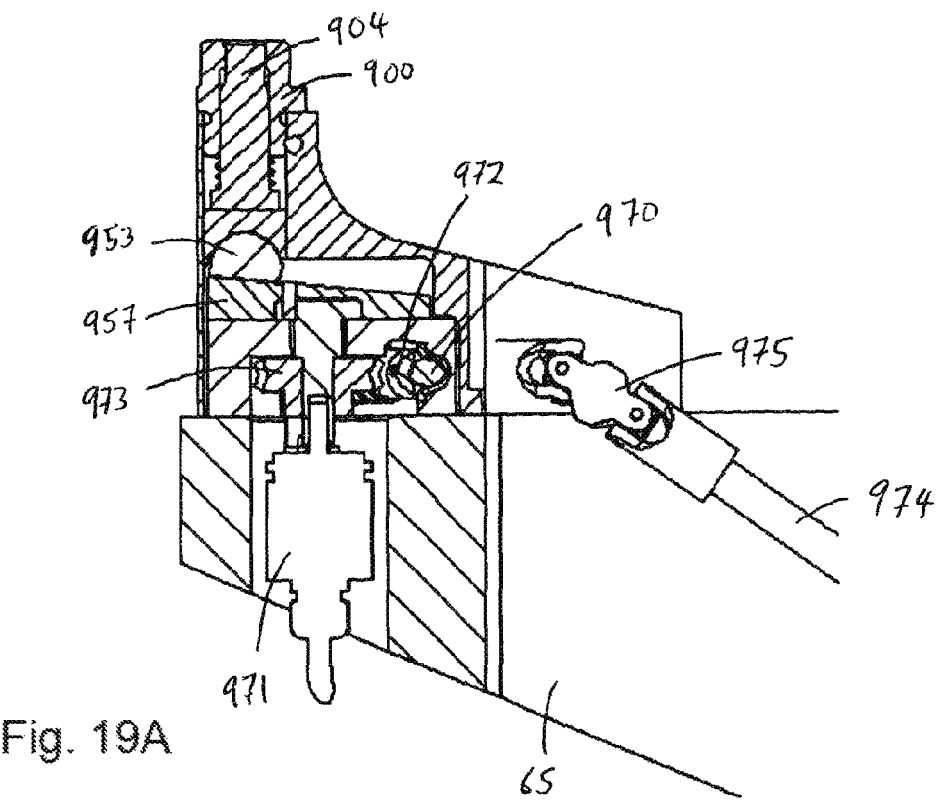
FIGS. 19A and 19B are a cross-sectional view and a perspective view of an upsetting die assembly according to an alternative embodiment of the invention.
Figure 19B:
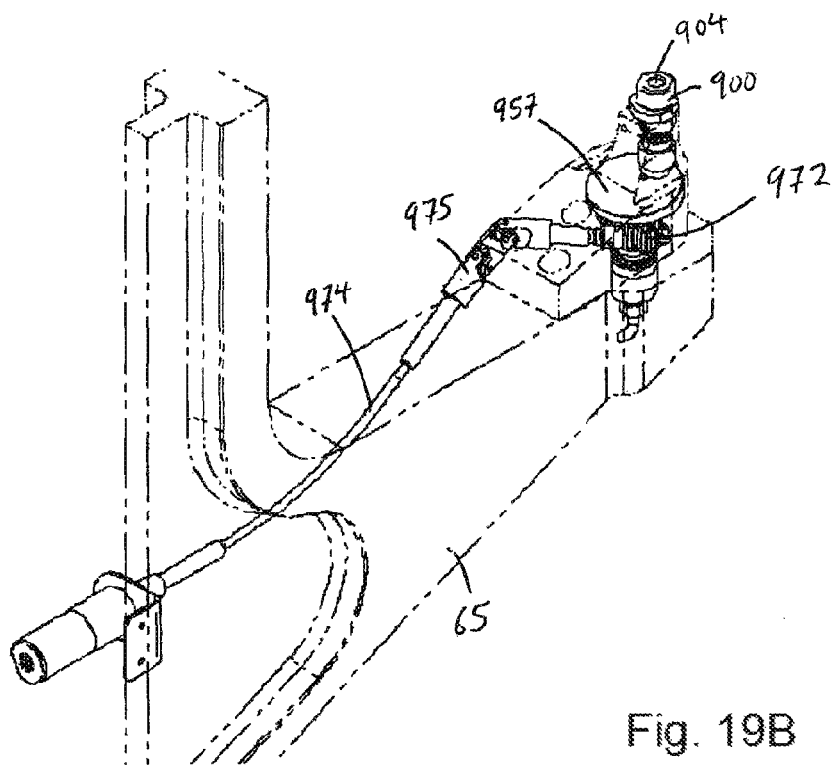

A further alternative embodiment of the invention is shown in FIGS. 19A and 19B, the embodiment shown in cross-section in FIG. 19A and in perspective view in FIG. 19B. Many features of the embodiment shown in FIGS. 19A and 19B correspond with the embodiment shown in FIG. 18, and these features are therefore not described again in connection with FIGS. 19A and 19B. Because limited space is available, not all of the features are labelled in FIGS. 19A and 19B. Unlike the embodiment shown in FIG. 18, an actuator 970 and encoder 971 are provided as separate entities. The encoder 971 is located beneath the cam 957 and provides feedback regarding the orientation of the cam via an axial connection to the cam. The actuator comprises a grub screw 972 which engages with a cog 973 connected to the cam 957, such that the cog (and hence the cam) rotates when the grub screw rotates. The grub screw 972 is driven to rotate by a motor (not shown), a flexible drive 974 extending from the motor to the grub screw. The flexible drive 974 may for example include a universal joint 975.

Operation of the embodiment shown in FIGS. 19A and B is the same as operation of the embodiment shown in FIG. 18, except that actuation of the cam 957 and monitoring of the orientation of the cam are provided separately.

As described above, in the embodiments of the invention illustrated in FIGS. 2 to 6, the resilient bias provided by the helical spring 118, 218 pushes the rod 104, 204 away from the adjustable end stop 124, 240. This means that changing the configuration of the adjustable end stop 124, 240 does not immediately change the volume of the upsetting die. However, changing the configuration of the adjustable end stop 124, 240 selects the upsetting volume of the upsetting die. This is because when upsetting of a rivet takes place, the helical spring 118, 218 will be compressed such that the upsetting volume of the upsetting die is determined by the configuration of the adjustable end stop 124, 240. In embodiments of the invention in which the rod is not biased upwards, when the configuration of the adjustable end stop (e.g. cam 351, 470, 580) is changed, this selects the volume of the upsetting die by immediately changing the volume of the upsetting die.

The volume of the upsetting die may remain fixed during upsetting of a rivet. Alternatively, the upsetting die may be configured to allow its diameter (and hence volume) to change passively during upsetting of a rivet. In this context the term 'passively' may be interpreted as meaning varying under the influence of force applied by the punch of the fastening apparatus during upsetting of a rivet (i.e. without active control by a control apparatus). For example, the collar of the upsetting die may be formed from a plurality of pieces which are resiliently biased against the rod but which may be displaced outwards during upsetting of a rivet. An example of this arrangement is described in U.S. Pat. No. 7,287,411 which is herein incorporated by reference. If the upsetting die is configured to allow its diameter to change passively during upsetting of a rivet, the selection of the upsetting volume may be considered to be the selection of the volume of the upsetting die during upsetting without taking into account passive changes of the diameter of the die during upsetting.

In embodiments of the invention, selection of the upsetting volume of the upsetting die may be controlled by a control apparatus. The control apparatus may form part of the control system 71 of the fastener system (see FIG. 1) or may be a separate apparatus 73. The control apparatus may be remote from the upsetting die, and may for example be connected to an actuator which is configured to adjust the volume of the upsetting die. Alternatively, the control apparatus may be located adjacent to the upsetting die, for example being located on the C-clamp 63. The control apparatus may be arranged to receive and store different upsetting die volumes which are to be used when fastening at different fastening locations. During fastening, the control apparatus may refer to this stored information in order to determine what upsetting die volume is required when fastening at a given fastening location, and may then adjust the upsetting die volume accordingly. The control apparatus may for example be an electronic apparatus, for example a microprocessor, and may for example comprise a programmable logic controller. The control apparatus may for example be part of a more complex control apparatus, for example a control apparatus which controls movement of a robot upon which the fastening apparatus is provided, and/or controls delivery of rivets to the fastening apparatus, and/or controls a production line.

The upsetting volume of the upsetting die may be selected according to the dimensions of a rivet which is to be used in a fastening process. Thus, for example, the control apparatus may store information relating to the upsetting volumes that are appropriate for rivets with different dimensions. An operator of the fastening apparatus may input into the control apparatus information which identifies the rivets to be used at different fastening locations. The control apparatus may then refer to the stored upsetting volume information and use this information to select an upsetting volume appropriate to the rivet to be used, prior to fastening at each location. The control apparatus may also store information relating to the thickness and/or hardness of the material(s) to be fastened, and may take this information into account when selecting an upsetting volume to be used at a given fastening location.

In an embodiment, fastening at some locations may be via the use of a clinch joint. Where this is the case, information relating to the upsetting volume of the upsetting die to be used when forming a clinch joint may be stored by the control apparatus. An operator of the fastening apparatus may input into the control apparatus information which identifies the fastening locations at which a clinch joint is to be used. The control apparatus may then refer to the stored clinch joint upsetting volume information and use this information to select an appropriate upsetting volume prior to forming a clinch joint.

Additionally or alternatively, the control apparatus may take into account feedback received during a previous fastening process when adjusting the upsetting volume of the upsetting die. The feedback may for example be provided from the punch or from the upsetting die. For example, the feedback may comprise the measured movement of the punch (e.g. the stroke of the punch). The movement of the punch may for example be measured using a measurement sensor such as a transducer (e.g. a linear variable displacement transducer) or one or more proximity sensors (e.g. inductive proximity sensors). Additionally or alternatively the feedback may comprise the force experienced by the punch and/or the force experienced by the upsetting die. The force may for example be measured using a force sensor such as a load cell or strain gauge.

The selection of the upsetting volume by the control apparatus may be based upon the dimensions of a rivet which is to be used and the material combination of the workpiece to be fastened. The selection of the upsetting volume by the control apparatus may also take into account feedback received during one or more previous fastening processes. The control apparatus may for example determine from the feedback that a previous fastening process provided sub-optimal fastening, and may adjust the volume of the upsetting die to provide improved fastening. In one example, the thickness of the workpiece may be greater than expected, and feedback received by the control apparatus may indicate that sub-optimal fastening has occurred. The control apparatus may determine that an increased upsetting volume of the upsetting die will provide improved fastening, and may then accordingly select an increased volume of the upsetting die. For a given type of rivet, the control apparatus may take into account feedback received when previously fastening with that type of rivet, and may exclude feedback received when fastening with a different type of rivet (e.g. a rivet having different dimensions). The control apparatus may for example determine a desired upsetting volume by comparing feedback received during insertion of a rivet with feedback recorded during a 'learning phase'. The feedback recorded during the learning phase may for example comprise feedback received during optimal fastening (or during fastening which satisfies one or more quality criteria).

In an embodiment, the fastening apparatus may be used to provide fastening with only one type of rivet (or clinching joint) and for one material combination. Where this is the case, the selection of the upsetting volume by the control apparatus may be based solely on feedback received during one or more previous fastening processes. The control apparatus may for example determine from the feedback that a previous fastening process provided sub-optimal fastening, and may adjust the volume of the upsetting die to provide improved fastening. In one example, the thickness of the workpiece may be less than expected, and feedback received by the control apparatus may indicate that sub-optimal fastening has occurred. The control apparatus may determine that a reduced upsetting volume of the upsetting die will provide improved fastening, and may then accordingly select an increased volume of the upsetting die.

The above may be considered to be examples of automated selection of the upsetting volume of the upsetting die performed by a control apparatus. The automated selection of the upsetting volume of the upsetting die may be based upon previously stored information (examples of which are given above) and/or based on feedback. 20.

The control apparatus may be capable of selecting an upsetting volume of the upsetting die individually for each fastener which is inserted into a workpiece. This may comprise for example taking into account for each fastener at least one of: properties of the fastener, properties of the workpiece, or feedback generating during a previous fastening operation, and then determining whether the upsetting volume of the upsetting die should be changed (and changing the upsetting volume if necessary). Although the control apparatus may be capable of selecting an upsetting volume of the upsetting die individually for each fastener, it is not essential that the control apparatus is configured to do so in all situations (although the control apparatus may be so configured). For example, in some situations the control apparatus may be configured to maintain a particular upsetting volume for a series of fastening operations (e.g. fastening operations which are all performed using the same type of rivet and using a workpiece having properties which are substantially constant for the series of fastening operations).

The upsetting dies provided by embodiments of the invention may include a pip or may not include a pip (either form of upsetting die may be used). The pip may have a shape which differs from the shapes shown in FIGS. 2-6. If a pip is provided then the depth of the die may be measured from the upper surface 106, 206, 606, 706, 806, 906 of the rod 104, 204, 604, 704, 804, 904 rather than from the top of the pip 108, 208, 608, 708. The depth of the die may be measured as the distance from the lowermost point in the upsetting die to the top of the collar 130, 230, 330, 430, 630, 730, 830, 930 (or top of the sleeve 798 if the sleeve forms sides of the upsetting die). In some instances the pip may project above the top of the upsetting die.

Embodiments of the invention may be configured to change the depth of the upsetting die for example from a depth of 0 mm to a depth of 1.5 mm, a depth of 3 mm, a depth of 4 mm or more (optionally including intermediate depths). A selected depth of the upsetting die will depend in part upon the size of the rivets which are to be upset using the upsetting die. The selected depth of the die may scale as the length and/or diameter of a rivet increases. Thus, if different future standard rivet sizes are adopted a deeper upsetting die may be selected.

Embodiments of the invention may be configured to change the depth of the upsetting die for example between 1.5 mm and 3 mm (optionally including intermediate depths). This may be desirable for example when using rivets having a shank diameter of 5.3 mm (this is one of the standard sizes in which rivets are provided).

Embodiments of the invention may be configured to change the depth of the upsetting die for example between 0 mm and 1.5 mm (optionally including intermediate depths). This may be desirable for example when using rivets having a shank diameter of 3.3 mm (this is another of the standard sizes in which rivets are provided).

Embodiments of the invention may be configured to change the depth of the upsetting die by increments of less than 0.1 mm Embodiments of the invention may be configured to change the depth of the upsetting die by increments of 0.1 mm or more, by increments of 0.2 mm or more, or by increments of 0.3 mm or more. Embodiments of the invention may be configured to change the depth of the upsetting die by increments of around 0.25 mm. Embodiments of the invention may be configured to provide changes of the depth of the upsetting die in a continuous manner.

Embodiments of the invention may for example allow workpieces having thicknesses between 1 mm and 15 mm to be riveted using self piercing rivets. Embodiments of the invention may be capable of fastening workpieces using rivets having lengths between 3 mm and 18 mm.

The helical spring 118, 218 (or other biasing means) may assist in disengagement of a fastened workpiece and the upsetting die. This is because it pushes the fastened workpiece upwards (in embodiments in which the workpiece may move upwards) or pushes the upsetting die downwards (in embodiments in which the upsetting die may move downwards). Additionally or alternatively, the adjustable end stop 124, 240, 351, 470, 580, 957 may disengage or assist in disengagement of the fastened workpiece and the upsetting die. This may be achieved by actuating the adjustable end stop to push the rod 104, 204, 304, 404, 904 upwards and thereby push the fastened workpiece and the upsetting die apart. The adjustable end stop may for example be actuated such that the upsetting die has a zero depth or such that the rod protrudes beyond the top of the housing. The helical spring 118, 218 and/or adjustable end stop 124, 240, 351, 470, 580 may also remove or assist in the removal of waste material from the upsetting die (the material having been released or sheared from the workpiece during fastener insertion). The waste material may for example be adhesive which has been pressed out of the workpiece during fastening. The workpiece and the waste material may both be considered to be examples of workpiece material.

In the embodiment shown in FIGS. 13-14 the helical spring 618 (or other biasing means) may act together with the cam 640 to assist in separation of workpiece material and the upsetting die. The cam 640 may for example be moved from a configuration which provides an upsetting die having a volume used for insertion of a fastener to a configuration which provides a smaller upsetting die volume. The selection of the smaller upsetting die volume, together with the bias provided by the helical spring 618 may push workpiece material out of the upsetting die.

Figure 16:
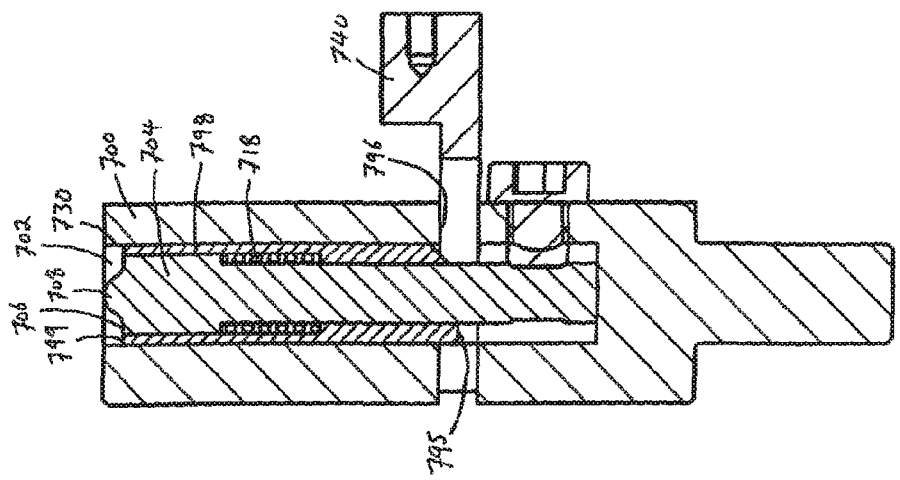
FIG. 16 is a cross-sectional view of the upsetting die assembly of FIG. 15 in a second configuration.

In the embodiment shown in FIGS. 15-16 the helical spring 718 (or other biasing means) may act together with the cam 740 to assist in separation of workpiece material and the upsetting die. The cam 740 may for example be moved from a configuration which provides an upsetting die having a volume used for insertion of a fastener to a configuration which provides a larger upsetting die volume. This will allow the sleeve 798 to move downwards under the bias provided by the helical spring 718, thereby separating the sleeve 798 and the workpiece material and allowing the workpiece material to be removed from the upsetting die.

In an alternative approach, the cam 740 may for example be moved from a configuration which provides an upsetting die having a volume used for insertion of a fastener to a configuration which provides a smaller upsetting die volume. This will push the sleeve 798 upwards such that the sleeve pushes the workpiece material upwards, and may push the workpiece material out of the upsetting die.

In an embodiment, the adjustable end stop 124, 240, 351, 470, 580 or cam 640, 740, 957 may be moved from a configuration used for insertion of a fastener (or formation of a clinch joint) to a configuration used to separate workpiece material and the upsetting die after each fastening process.

Changing the configuration of the adjustable end stop 124, 240, 351, 470, 580 or cam 640, 740, 957 to separate workpiece material from the upsetting die may for example take place after the punch has been withdrawn from the upsetting die or during withdrawal of the punch from the upsetting die. Changing the configuration of the adjustable end stop or cam may be combined with movement of the upsetting die away from the workpiece (e.g. through movement of the C-frame) or with movement of the workpiece away from the upsetting die.

Although the actuators shown in the embodiments illustrated in FIGS. 7-12 are located adjacent to the cams which they are actuating, the actuators may be located away from the cams. Similarly, actuators used by the embodiments illustrated in FIGS. 2-6 may be located adjacent to the adjustable end stops or away from the adjustable end stops.

Locating an actuator away from an adjustable end stop may be advantageous. For example, the actuator may be located away from parts of the C-clamp 65 which are close to a workpiece during fastening of the workpiece, thereby avoiding the possibility that the actuator acts as an obstruction.

Some of the above described embodiments of the invention include a flat or substantially flat upper surface at an upper end of the rod. This is not essential however, and the upper end of the rod may have any suitable shape.

The above description refers to changing the volume of the upsetting die when switching between fastening using rivets having different dimensions. The volume of the upsetting die may be changed when switching between fastening using rivets having different hardnesses (a different hardness may require a different upsetting volume even if the rivet dimensions are unchanged).

There may be circumstances in which the volume of the upsetting die is changed when fastening using rivets having the same dimensions and the same hardness. For example, embodiments of the invention may be used to insert rivets having the same dimensions and hardness into two workpieces having different material combinations, the volume of the upsetting die being changed to accommodate the different material combinations. The term "material combination" may refer to the thicknesses of materials which comprise the workpieces and/or may refer to the types of material which comprise the workpieces. For example, a workpiece which includes a layer of adhesive may require a different upsetting die volume than an equivalent workpiece which does not include a layer of adhesive.

Embodiments of the invention may be used to insert rivets having different dimensions and/or hardnesses into workpieces comprising different material combinations.

The fastening apparatus may include a feeder which is capable of feeding rivets having two different geometries (or more) to the nose assembly 68 (see FIG. 1) of the fastening apparatus.

The actuators which are used to change the volume of the upsetting die may for example be electrical, mechanical, hydraulic or pneumatic (e.g. a pneumatic cylinder, piezoelectric actuator, stepper-motor or the like). They may be controlled by the control apparatus. The actuators may have open or closed loop feedback control, which may allow accurate setting of the die volume and transition between different desired volumes in whatever progression is desired. Feedback (e.g. positional information) from the actuators or from the upsetting die may pass to the control apparatus, which may take the feedback into account when controlling the actuators. The feedback may for example be provided by sensors and/or other detectors.

An implementation of the invention may be in an automated production line for vehicle bodies where a plurality of robot manipulated systems are used to insert fasteners. During a typical cycle, a robot may insert a quantity of first fasteners and a quantity of second or third fasteners, with the die volume being adjusted between fasteners according to which fastener is supplied and/or changes in the workpiece between fastening locations. The quantity and sequence of changes to the upsetting volume of the upsetting die, and the upsetting volume resulting from each change will vary from application to application (for example depending on the change in workpiece and/or fastener between fastening locations). For instance, a robot may insert 15 fasteners in a cycle, with 10 fasteners having the first upsetting volume and then 5 fasteners having the second upsetting volume. Alternatively, the upsetting volume may be adjusted before each fastener.

In an embodiment, fastening with rivets may be alternated with fastening with clinch joints. A clinch joint does not use a fastener but instead uses a punch to push a workpiece into an upsetting die, fastening being provided by deformation of the workpiece. An embodiment of the invention may provide fastening with rivets using an upsetting die having an upsetting volume, and may then provide fastening with a clinch joint using an upsetting die having a different upsetting volume (the upsetting volume of the upsetting die being selected as described above).

Computer programs may be provided to instruct the fastening apparatus to carry out the methods described herein. Such computer programs may be carried on appropriate computer readable media, which term includes appropriate tangible storage devices (e.g. discs).

Although embodiments of the invention have been described in the context of rivet insertion, the invention may be used with fasteners other than rivets. In this context the term "fastener" may include rivets (including self-piercing rivets), screws, slugs, weld studs, mechanical studs and other types of fastening devices.

Various terms such as vertical, horizontal, lower and higher may be used in the description of embodiments of the invention. These terms are used merely to facilitate description of the embodiments and are not intended to imply that the faster apparatus or any components of the fastening apparatus must have a particular orientation.

The term "workpiece" may include any combination of materials and material types, including adhesive, that are to be fastened whether part of the same structure or separate structures.

Features of embodiments of the invention may be used in combination with features of other embodiments of the invention.

The invention claimed is:

1. A method for inserting two or more fasteners of different types into a workpiece, the method comprising:
using a control apparatus to select a first upsetting volume of an upsetting die according to the dimensions and/or hardness of a first fastener of a first type, using a punch to push the first fastener into a workpiece and using the upsetting die to upset the first fastener, then using the control apparatus to select a second upsetting volume of the upsetting die according to the dimensions and/or hardness of a second fastener of a second type, using the punch to push the second fastener into a workpiece and using the upsetting die to upset the second fastener, wherein the first fastener and the second fastener have different dimensions and/or hardnesses.

2. The method of claim 1, wherein the selection of the upsetting volume of the upsetting die by the control apparatus is automated.

3. The method of claim 2, wherein the selection of the upsetting volume of the upsetting die is based on previously stored information and/or feedback.

4. The method of claim 3, wherein the feedback includes one or more of movement of the punch, force experienced by the punch and force experienced by the upsetting die.

5. The method of claim 3, wherein the control apparatus determines and selects an upsetting volume of the upsetting die which will provide improved fastening based upon the feedback.

6. The method of claim 1, wherein the method further comprises again selecting the first upsetting volume of the upsetting die, and using the punch to push a subsequent fastener into a workpiece and using the upsetting die to upset the subsequent fastener.

7. The method of claim 1, wherein the upsetting volume of the upsetting die is fixed during upsetting of the fasteners.

8. The method of claim 1, wherein selecting the upsetting volume of the upsetting die comprises selecting the depth of the upsetting die.

9. The method of claim 1, wherein the upsetting die is at least partially formed by a surface of a rod located in a bore, the rod being moved within the bore to change the upsetting volume of the upsetting die.

10. The method of claim 9, wherein the position of the rod within the bore is determined by an adjustable end stop.

11. The method of claim 10, wherein the adjustable end stop comprises a cam which is moveable between a plurality of configurations which determine the position of the rod within the bore.

12. The method of claim 11, wherein the cam is a plate which is configured to rotate about an axis of rotation.

13. The method of claim 1, wherein the upsetting die is at least partially formed by a surface of a rod located in a bore in a housing, the housing being moved relative to the rod to change the upsetting depth of the upsetting die.

14. The method of claim 1, wherein the upsetting die is at least partially formed by a surface of a rod located in a bore in a housing and is at least partially formed by a sleeve located between the rod and the housing, the sleeve being moved relative to the rod and the housing to change the upsetting diameter of the upsetting die.

15. The method of claim 1, wherein the first fastener and the second fastener have the same dimensions, and the workpiece into which the second fastener is pushed comprises a combination of materials which is different than the combination of materials which comprises the workpiece into which the first fastener is pushed.

16. The method of claim 1, wherein the selection of the second upsetting volume of the upsetting die is performed whilst the punch and upsetting die are moving between a first fastening location and a second fastening location, or whilst the workpiece is being moved between a first fastening location and a second fastening location.

17. The method of claim 1, wherein the upsetting volume of the upsetting die is selected using an actuator.

18. The method of claim 1, wherein the method further comprises selecting a volume which is different from the first upsetting volume or the second upsetting volume and thereby separating or assisting in separation of workpiece material and the upsetting die.

19. An apparatus for inserting two or more fasteners of different types into a workpiece, the apparatus comprising:
a punch and an upsetting die, wherein the upsetting volume of the upsetting die is adjustable;
an actuator and control apparatus which are configured to adjust the upsetting volume of the upsetting die, the control apparatus being configured to select a first upsetting volume of the upsetting die according to the dimension and/or hardness of a first fastener of a first type to upset the first fastener inserted into a workpiece, and to then select a second upsetting volume of the upsetting die according to the dimension and/or hardness of a second fastener of a second type to upset the second fastener inserted into a workpiece, wherein the first fastener and the second fastener have different dimensions and/or hardnesses.

20. The apparatus of claim 19, wherein the control apparatus is configured to select the upsetting volume of the upsetting die in an automated manner.

21. The apparatus of claim 19, wherein the control apparatus is configured to select the upsetting volume of the upsetting die based on previously stored information and/or feedback.

22. The apparatus of claim 19, wherein the actuator and control apparatus are configured to fix the upsetting volume of the upsetting die during upsetting of the fasteners.

23. The apparatus of claim 19, wherein the upsetting die is at least partially formed by a surface of a rod located in a bore, the rod being movable within the bore to change the upsetting volume of the upsetting die.

24. The apparatus of claim 23, wherein the apparatus further comprises an adjustable end stop which is configured to determine the position of the rod within the bore during upsetting of a fastener.

25. The apparatus of claim 24, wherein the adjustable end stop comprises a cam which is moveable between a plurality of configurations which determine the position of the rod within the bore.

26. The apparatus of claim 25, wherein the cam is a plate which is configured to rotate about an axis of rotation.

27. The apparatus of claim 19, wherein the upsetting die is at least partially formed by a surface of a rod located in a bore in a housing, the housing being moveable relative to the rod to change the upsetting depth of the upsetting die.

28. The apparatus of claim 19, wherein the upsetting die is at least partially formed by a surface of a rod located in a bore in a housing and is at least partially formed by a sleeve located between the rod and the housing, the sleeve being moveable relative to the rod and the housing to change the upsetting diameter of the upsetting die.

29. The apparatus of claim 19, wherein the apparatus further comprises one or more sensors which are configured to provide feedback to the control apparatus which is measured during fastening.

30. The apparatus of claim 29, wherein the control apparatus is configured to determine and select an upsetting volume of the upsetting die which will provide improved fastening based upon the feedback.

31. The apparatus of claim 29, wherein the one or more sensors are configured to measure one or more of the movement of the punch, force experienced by the punch and force experienced by the upsetting die.

32. The apparatus of claim 19, wherein the control apparatus is configured to change the upsetting volume of the upsetting die whilst the fastening apparatus is moving between a first fastening location and a second fastening location, or whilst the workpiece is moving between a first fastening location and a second fastening location.

33. The apparatus of claim 19, wherein the control apparatus is configured to select a volume which is different from the upsetting volume after a fastener has been upset, thereby separating or assisting in separating workpiece material and the upsetting die.

34. A fastening system comprising:
an apparatus for inserting two or more fasteners of different types into a workpiece;
a punch and an upsetting die, wherein the upsetting volume of the upsetting die is adjustable;
an actuator and control apparatus which are configured to adjust the upsetting volume of the upsetting die, the control apparatus being configured to select a first upsetting volume of the upsetting die according to the dimension and/or hardness of a first fastener of a first type to upset the first fastener inserted into a workpiece, and to then select a second upsetting volume of the upsetting die according to the dimension and/or hardness of a second fastener of a second type to upset the second fastener inserted into a workpiece, wherein the first fastener and the second fastener have different dimensions and/or hardnesses;
a rivet feeding system; and
a control system.

* * * * *